United States Patent
Kang et al.

(10) Patent No.: US 11,140,673 B2
(45) Date of Patent: Oct. 5, 2021

(54) METHOD FOR REPORTING CHANNEL STATE INFORMATION IN WIRELESS COMMUNICATION SYSTEM, AND APPARATUS THEREFOR

(71) Applicant: LG ELECTRONICS INC., Seoul (KR)

(72) Inventors: Jiwon Kang, Seoul (KR); Kijun Kim, Seoul (KR); Hyungtae Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/637,727

(22) PCT Filed: Aug. 9, 2018

(86) PCT No.: PCT/KR2018/009103
§ 371 (c)(1),
(2) Date: Feb. 7, 2020

(87) PCT Pub. No.: WO2019/031879
PCT Pub. Date: Feb. 14, 2019

(65) Prior Publication Data
US 2020/0178223 A1    Jun. 4, 2020

Related U.S. Application Data

(60) Provisional application No. 62/566,537, filed on Oct. 2, 2017, provisional application No. 62/542,818, filed on Aug. 9, 2017.

(51) Int. Cl.
*H04W 72/04* (2009.01)
*H04L 5/00* (2006.01)

(52) U.S. Cl.
CPC ......... *H04W 72/042* (2013.01); *H04L 5/0048* (2013.01); *H04L 5/0053* (2013.01)

(58) Field of Classification Search
CPC ... H04W 72/042; H04L 5/0048; H04L 5/0053
See application file for complete search history.

(56) References Cited

U.S. PATENT DOCUMENTS

2013/0083780 A1    4/2013  Luo et al.
2014/0161093 A1*   6/2014  Hoshino .................. H04L 5/00
(Continued)

OTHER PUBLICATIONS

PCT International Application No. PCT/KR2018/009103, International Search Report dated Nov. 13, 2018, 4 pages.
(Continued)

*Primary Examiner* — Ronald B Abelson
(74) *Attorney, Agent, or Firm* — Lee, Hong, Degerman, Kang & Waimey

(57) ABSTRACT

The present specification provides a transmission and reception method for reporting channel state information (CSI) in a wireless communication system, and an apparatus therefor. Particularly, the method for reporting the CSI in the wireless communication system comprises the steps of, receiving, from a base station, configuration information for control channel-based CSI reporting, receiving, from the base station, downlink control information including information for indicating a CSI reporting time at which the control channel-based CSI reporting is performed, and reporting the CSI, which is measured by a CSI-reference signal (CSI-RS) received from the base station, through the control channel at the CSI reporting time, wherein the configuration information can include information for indicating one or more control channel resources allocated for the control channel-based CSI reporting.

13 Claims, 10 Drawing Sheets

(56) References Cited

U.S. PATENT DOCUMENTS

2015/0207600 A1     7/2015   Park et al.
2018/0279145 A1*   9/2018   Jung .................... H04W 24/08

OTHER PUBLICATIONS

ZTE, "On CSI framework details," 3GPP TSG-RAN WG1 NR AdHoc#2, R1-1710187, Jun. 2017, 15 pages.
Nokia, "On the CSI timing relationships," 3GPP TSG-RAN WG1#88 bis, R1-1705992, Mar. 2017, 7 pages.
LG Electronics, "Discussion on CSI timing," 3GPP TSG-RAN WG1 Ad-Hoc Meeting, R1-1700473, Jan. 2017, 7 pages.

* cited by examiner

【Fig. 1】
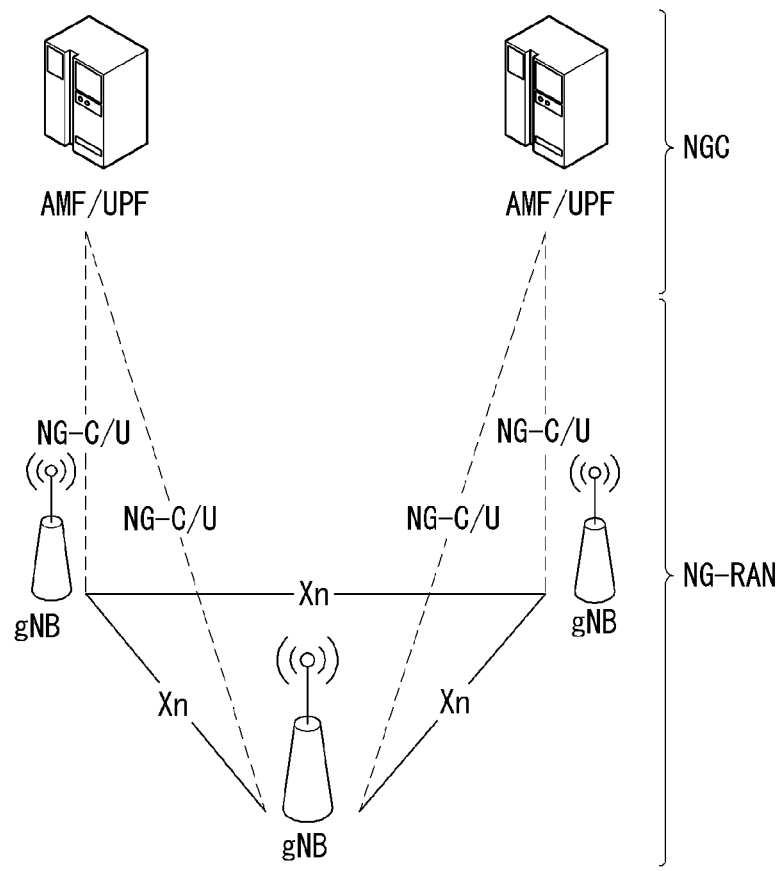
【Fig. 2】
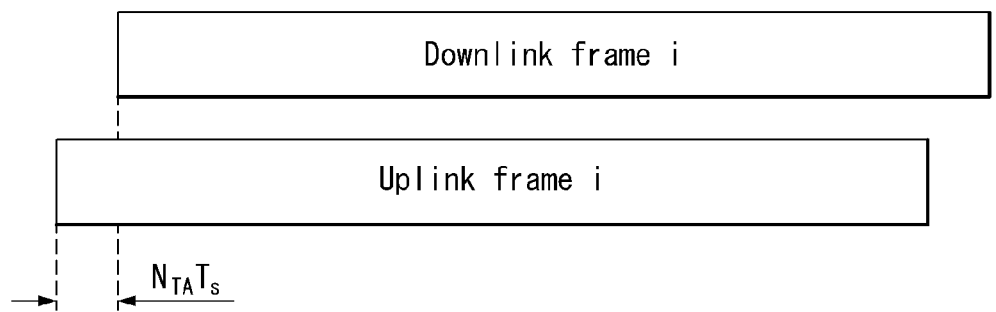

[Fig. 3]
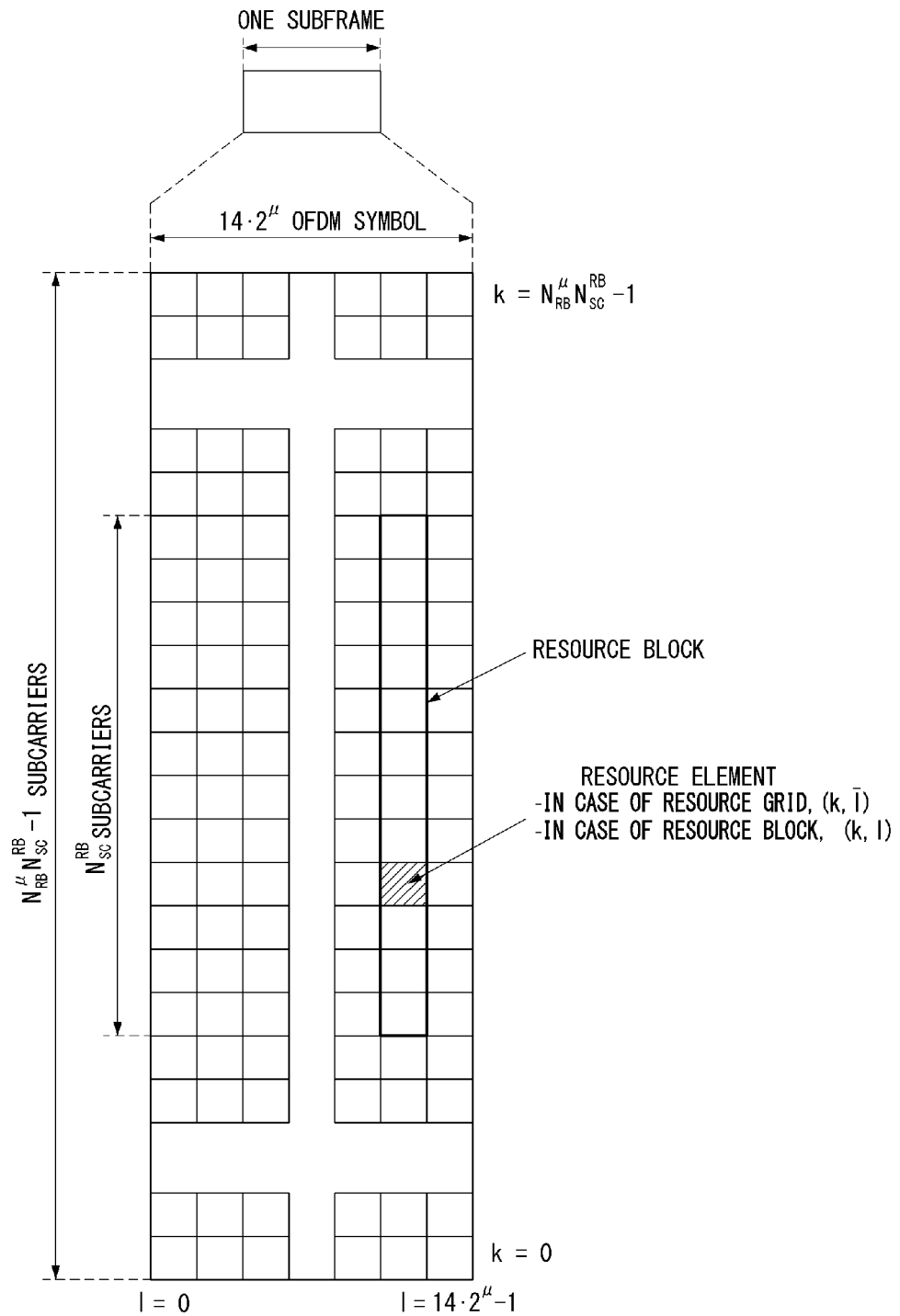

[Fig. 4]
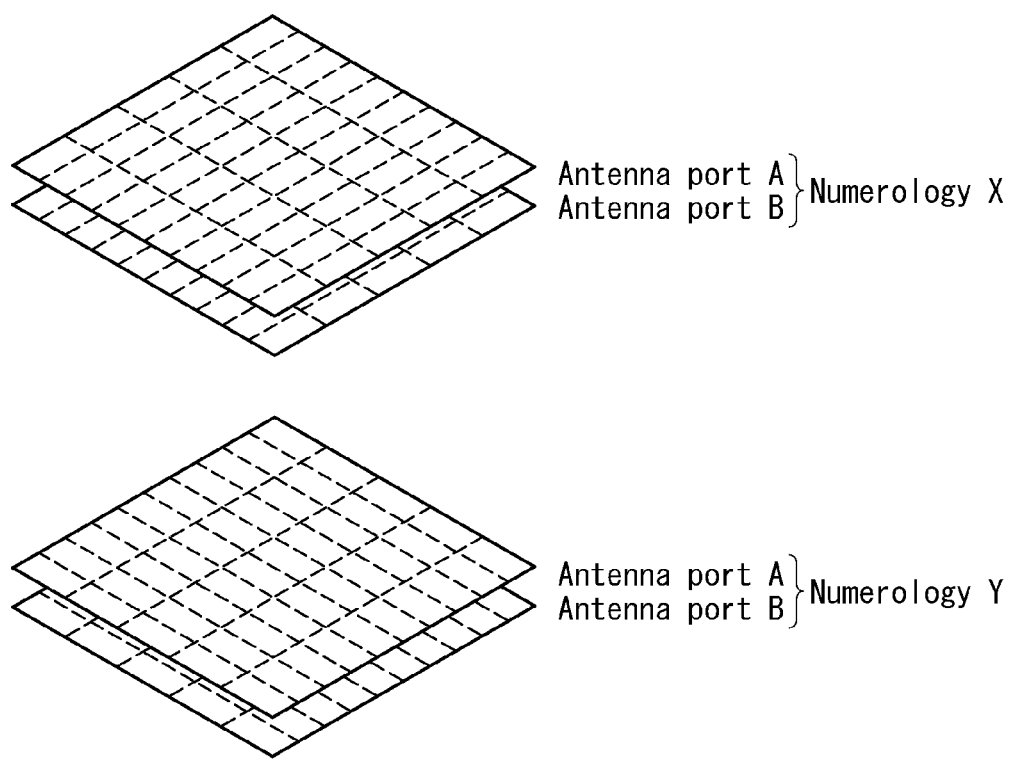

[Fig. 5]
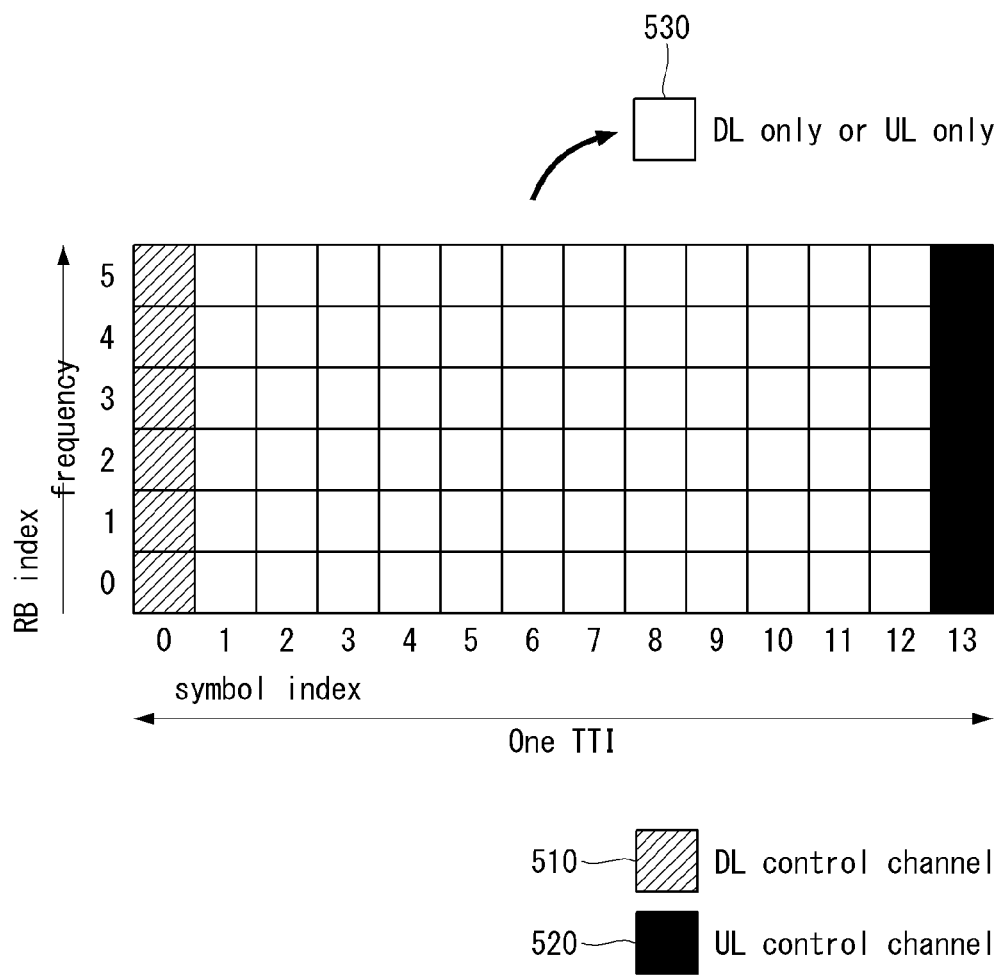

[Fig. 6]
(a)
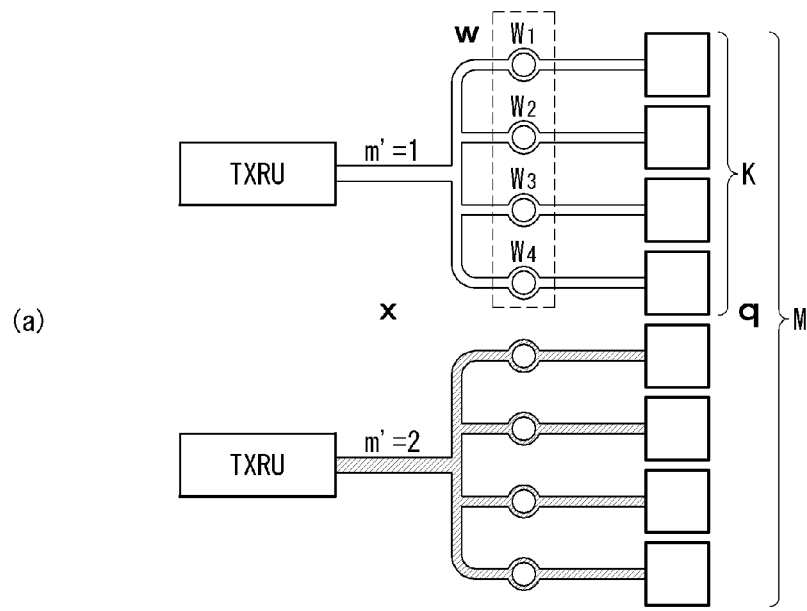
(b)
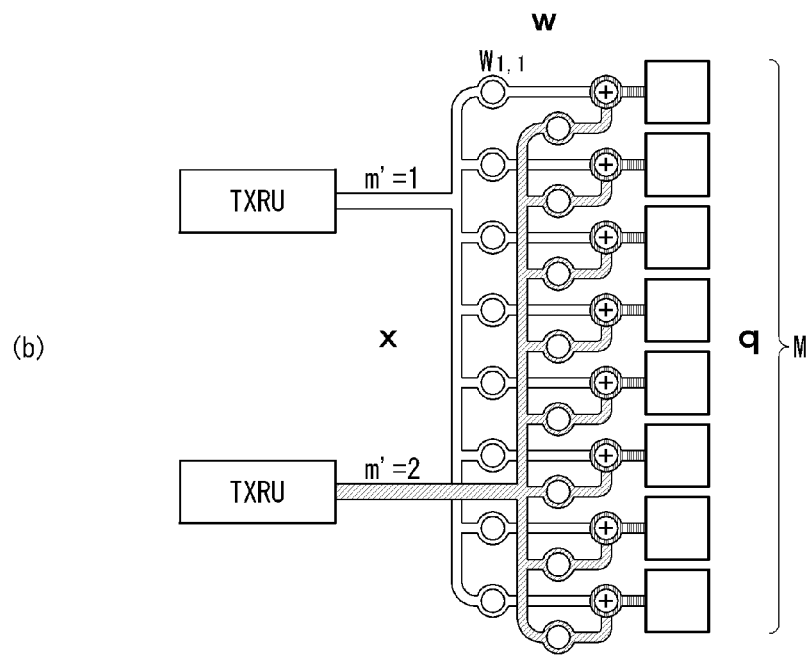

【Fig. 7】
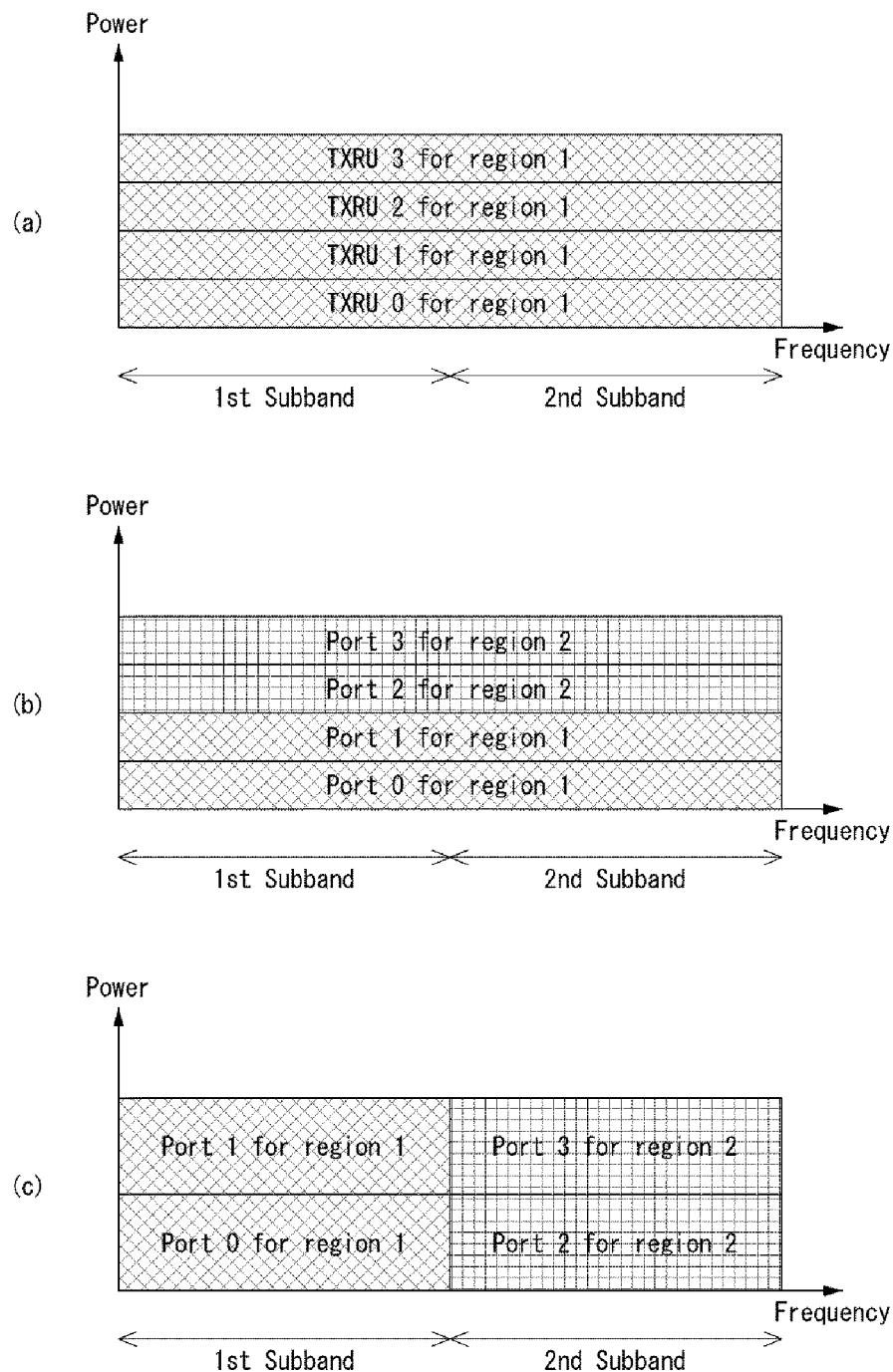

[Fig. 8]
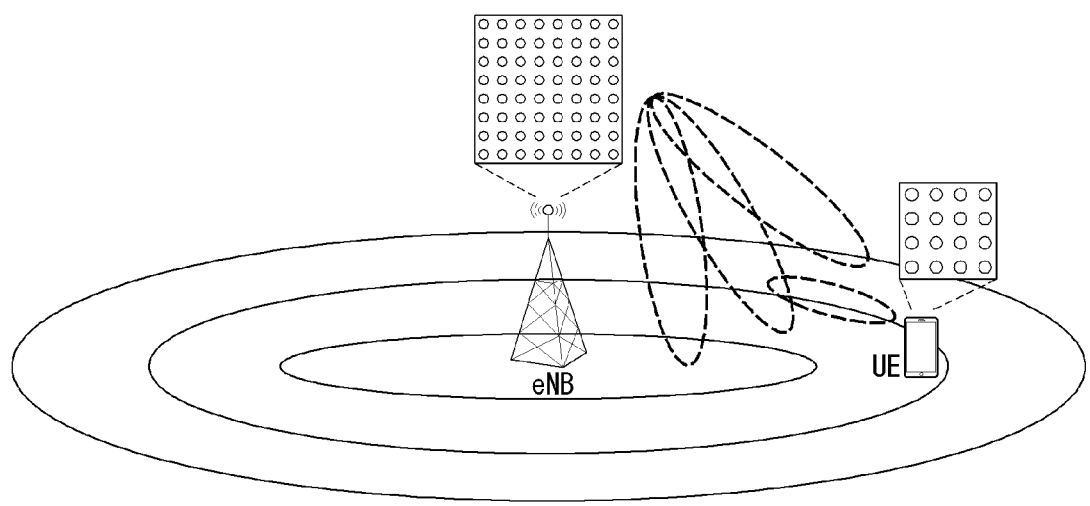

【Fig. 9】
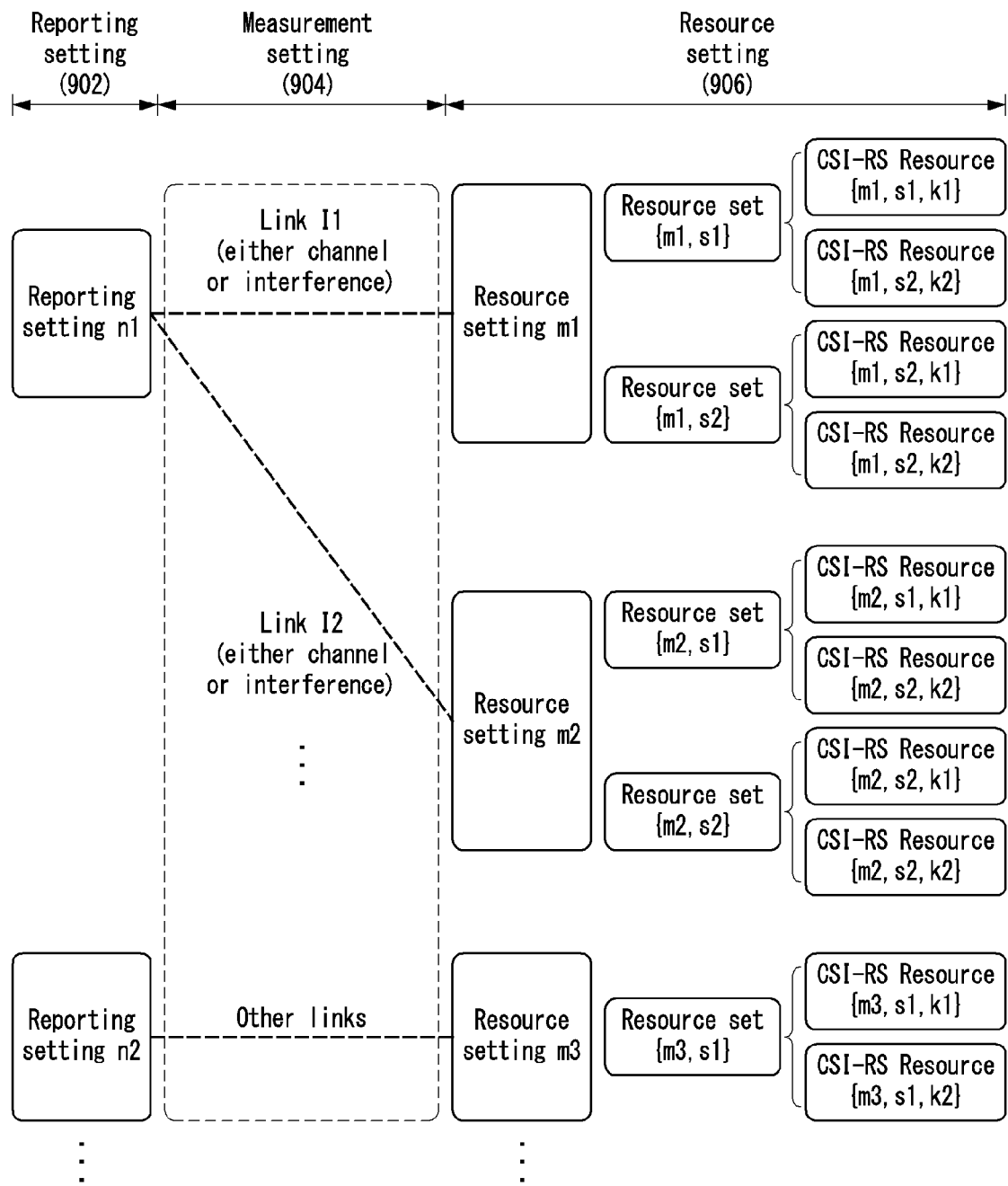

[Fig. 10]
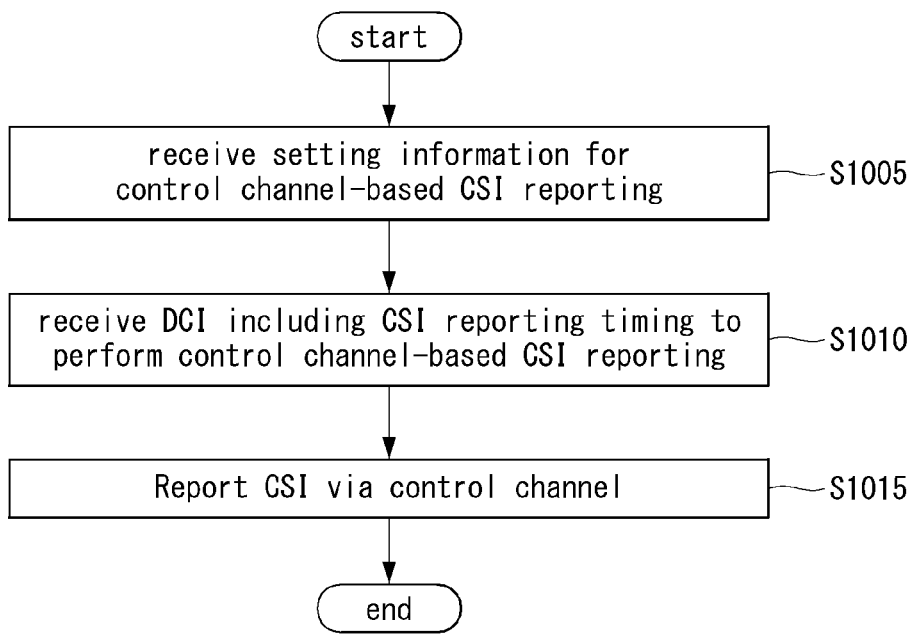
[Fig. 11]
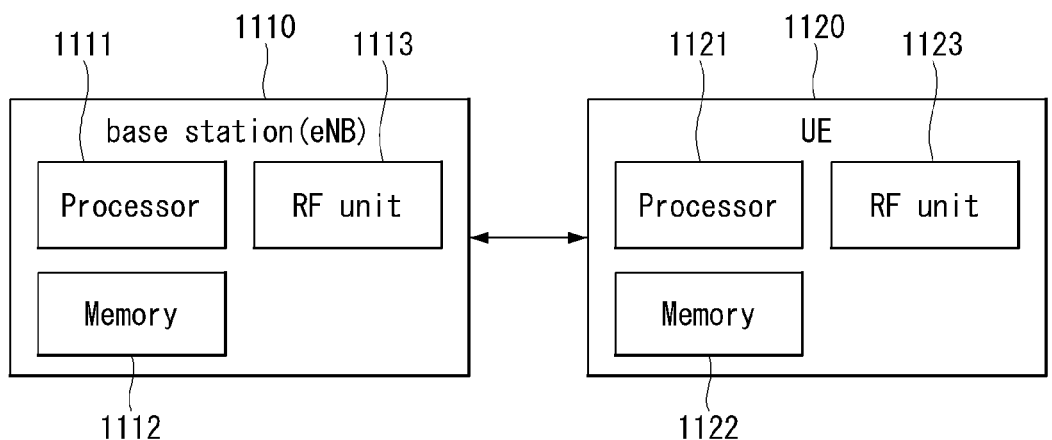

[Fig. 12]
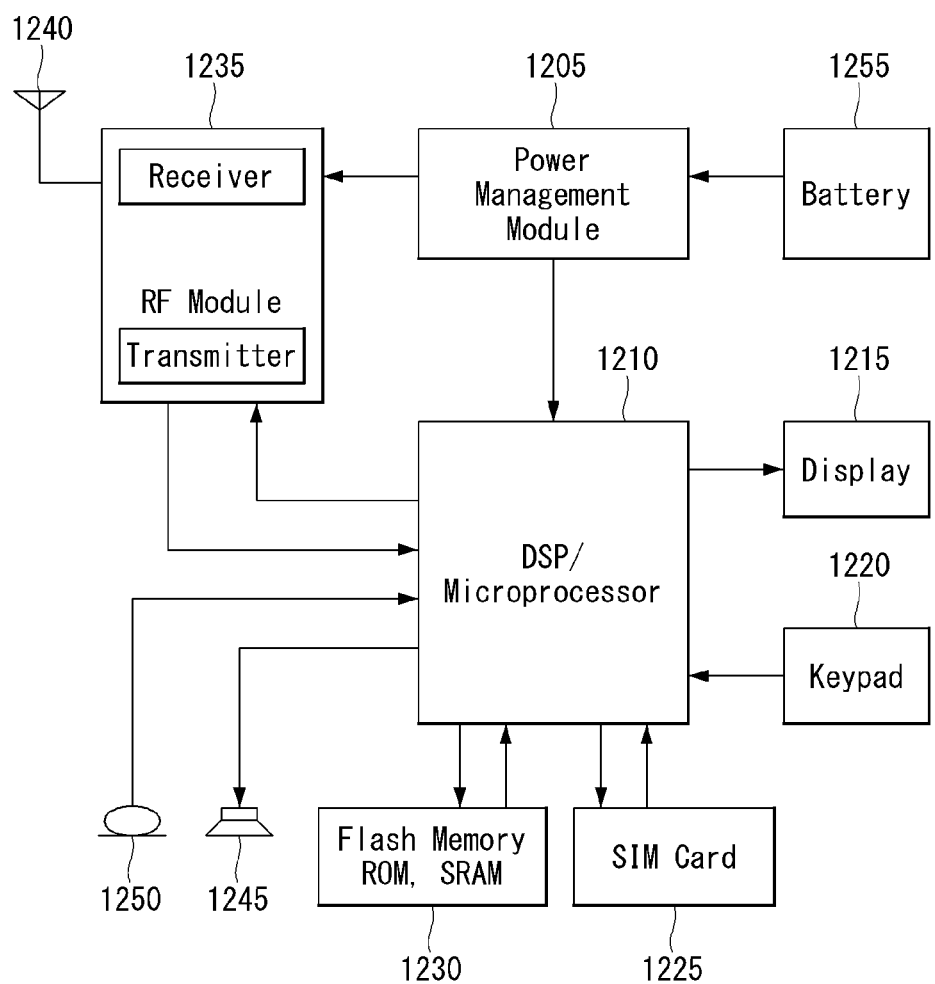

METHOD FOR REPORTING CHANNEL STATE INFORMATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2018/009103, filed on Aug. 9, 2018, which claims the benefit of U.S. Provisional Application No. 62/542,818, filed on Aug. 9, 2017, and 62/566,537, filed on Oct. 2, 2017, the contents of which are all hereby incorporated by reference herein in their entirety.

TECHNICAL FIELD

The disclosure relates to a wireless communication system, and more specifically, to a method for reporting channel state information and apparatus for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The disclosure proposes a method for reporting channel state information (CSI) in a wireless communication system and apparatus for the same.

In connection, according to the disclosure, there are proposed a method of performing CSI reporting considering a computation time for a UE's CSI reporting and transmission of uplink data and apparatus for the same.

Specifically, according to the disclosure, there are proposed a method of transmitting a CSI report and/or UL data based on an uplink data channel considering a timing offset related to the CSI report and/or a timing offset related to the uplink data and apparatus for the same.

The disclosure also proposes a method of performing CSI reporting based on an uplink control channel, not an uplink data channel, and apparatus for the same.

Technical objects of the disclosure are not limited to the above-described technical objects, and other technical objects not described above may be evidently understood by those skilled in the art to which the disclosure pertains from the following description.

Technical Solution

According to an embodiment of the disclosure, a method of reporting channel state information (CSI) by a user equipment (UE) in a wireless communication system comprises receiving, from a base station, setting information for control channel-based CSI reporting, receiving, from the base station, downlink control information including information indicating a CSI reporting timing when the control channel-based CSI reporting is to be performed, and reporting CSI measured by a channel state information reference signal (CSI-RS) received from the base station via a control channel at the CSI reporting timing, wherein the setting information may include information indicating one or more control channel resources allocated for control channel-based CSI reporting.

Further, according to an embodiment of the disclosure, in the method, the control channel-based CSI reporting may be aperiodic CSI reporting performed by receiving a triggering indication from the base station.

Further, according to an embodiment of the disclosure, in the method, the downlink control information may be downlink control information including uplink resource allocation information (e.g., uplink time/frequency resource allocation information) for uplink transmission.

Further, according to an embodiment of the disclosure, in the method, the downlink control information may further include an indicator indicating which one of control channel-based transmission or data channel-based transmission the CSI reporting time has been set for.

Further, according to an embodiment of the disclosure, in the method, when none of the one or more control channel resources are positioned at the CSI reporting timing, the CSI may be reported via a first control channel resource positioned after the CSI reporting timing among the one or more control channel resources.

Further, according to an embodiment of the disclosure, the method may further comprise, when none of the one or more control channel resources are positioned at the CSI reporting timing, transmitting a preset specific value to the base station via a first control channel resource positioned after the CSI reporting timing among the one or more control channel resources.

Further, according to an embodiment of the disclosure, in the method, the setting information may further include information indicating a CSI reporting timing range for the control channel-based CSI reporting. The CSI reporting timing range may be set according to at least one of a type of the control channel, a format of the control channel, the number of symbols constituting the control channel, or a physical resource block size of the control channel.

Further, according to an embodiment of the disclosure, in the method, the downlink control information may further include information indicating a CSI reporting timing offset between the control channel-based CSI reporting and the data channel-based CSI reporting.

Further, according to an embodiment of the disclosure, in the method, the setting information may further include candidate values for the CSI reporting timing offset. The CSI reporting timing offset indicated via the downlink control information may be one of the candidate values.

Further, according to an embodiment of the disclosure, in the method, the candidate values may be set in slot units in a time domain.

According to an embodiment of the disclosure, a user equipment (UE) reporting channel state information (CSI) in a wireless communication system comprises a radio frequency (RF) module for transmitting/receiving a radio signal and a processor functionally connected with the RF module, wherein the processor performs control to receive, from a base station, setting information for control channel-based CSI reporting, receive, from the base station, downlink control information including information indicating a CSI reporting timing when the control channel-based CSI reporting is to be performed, and report CSI measured by a channel state information reference signal (CSI-RS) received from the base station via a control channel at the CSI reporting timing, wherein the setting information may include information indicating one or more control channel resources allocated for control channel-based CSI reporting.

Further, according to an embodiment of the disclosure, in the UE, the control channel-based CSI reporting may be aperiodic CSI reporting performed by receiving a triggering indication from the base station.

Further, according to an embodiment of the disclosure, in the UE, the downlink control information may be downlink control information including uplink resource allocation information (e.g., uplink time/frequency resource allocation information) for uplink transmission.

Further, according to an embodiment of the disclosure, in the UE, the downlink control information may further include an indicator indicating which one of control channel-based transmission or data channel-based transmission the CSI reporting time has been set for.

Further, according to an embodiment of the disclosure, in the UE, the setting information may further include information indicating a CSI reporting timing range for the control channel-based CSI reporting. The CSI reporting timing range may be set according to at least one of a type of the control channel, a format of the control channel, the number of symbols constituting the control channel, or a physical resource block size of the control channel.

Advantageous Effects

According to the embodiments of the disclosure, it is possible to secure a computation time required for CSI reporting when a UE receives an indication or allocation of CSI reporting.

Further, according to the embodiments of the disclosure, it is possible to reduce the UE's blind decoding overhead since the timing offsets of a CSI report and uplink data transmissions are indicated using the same downlink control information (or the same downlink control information field).

Further, according to the embodiments of the disclosure, it is possible to perform both CSI-RS reception and CSI reporting within a short time or within one transmission unit (e.g., a self-contained slot/subframe) as CSI reporting is performed based on an uplink control channel. Thus, CSI reporting latency may be reduced.

Advantages which may be obtained in the disclosure are not limited to the aforementioned effects and other unmentioned advantages will be clearly understood by those skilled in the art from the following description.

DESCRIPTION OF DRAWINGS

The accompanying drawings, which are included herein as a part of detailed descriptions to help understanding the disclosure, provide embodiments of the disclosure and describe technical features of the disclosure with detailed descriptions below.

FIG. 1 illustrates one example of the overall system structure of an NR to which a method proposed by the present specification may be applied.

FIG. 2 illustrates a relationship between an uplink frame and a downlink frame in a wireless communication system to which a method proposed by the present specification may be applied.

FIG. 3 illustrates one example of a resource grid supported by a wireless communication system to which a method proposed by the present specification may be applied.

FIG. 4 shows examples of a resource grid for each antenna port and numerology to which a method proposed in this specification may be applied.

FIG. 5 is a view illustrating an example self-contained slot structure to which a method proposed in the disclosure is applicable.

FIG. 6 illustrates example connection schemes of antenna elements and a TXRU to which a method proposed in the disclosure is applicable.

FIG. 7 illustrates various example per-TXRU service areas to which a method proposed in the disclosure is applicable.

FIG. 8 illustrates an example MIMO system using a 2D plane array structure to which a method proposed in the disclosure is applicable.

FIG. 9 illustrates an example CSI framework considered in an NR system to which a method proposed in the disclosure is applicable.

FIG. 10 is a flowchart illustrating operations of a UE performing channel state information (CSI) reporting in a wireless communication system to which a method proposed in the disclosure is applicable.

FIG. 11 is a block diagram illustrating a configuration of a wireless communication device according to an embodiment of the disclosure.

FIG. 12 illustrates a block diagram of a communication device according to one embodiment of the disclosure.

MODE FOR INVENTION

In what follows, preferred embodiments of the disclosure will be described in detail with reference to appended drawings. Detailed descriptions to be disclosed below with reference to the appended drawings are intended to describe illustrative embodiments of the disclosure but are not intended to represent the sole embodiment of the disclosure. Detailed descriptions below include specific details to provide complete understanding of the disclosure. However, it should be understood by those skilled in the art that the disclosure may be embodied without the specific details to be introduced.

In some cases, to avoid obscuring the gist of the disclosure, well-known structures and devices may be omitted or may be depicted in the form of a block diagram with respect to core functions of each structure and device.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) may be replaced with a term such as fixed station, Node B, evolved-NodeB (eNB), Base Transceiver System (BTS), Access Point (AP), or gNB(next generation NB, general NB, gNodeB). Also, a terminal can be fixed or mobile, and the term may be replaced with a term such as User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the disclosure, and the specific terms may be used in different ways as long as it does not leave the technical scope of the disclosure.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

The embodiments of the disclosure may be supported by standard documents disclosed for at least one of wireless access systems such as the IEEE 802, 3GPP, and 3GPP2. In other words, those steps or portions among embodiments of the disclosure not described to clearly illustrate the technical principles of the disclosure may be backed up by the aforementioned documents. Also, all of the terms disclosed in the present document may be described by the aforementioned standard documents.

For the purpose of clarity, descriptions are given mainly with respect to the 3GPP LTE/LTE-A/NR(New RAT), but the technical features of the disclosure are not limited to the specific system.

Definition of Terms eLTE eNB, An eLTE eNB is an evolution of an eNB that supports a connection for an EPC and an NGC.

gNB, A node for supporting NR in addition to a connection with an NGC.

New RAN, A radio access network that supports NR or E-UTRA or interacts with an NGC.

Network slice, A network slice is a network defined by an operator so as to provide a solution optimized for a specific market scenario that requires a specific requirement together with an inter-terminal range.

Network function, A network function is a logical node in a network infra that has a well-defined external interface and a well-defined functional operation.

NG-C, A control plane interface used for NG2 reference point between new RAN and an NGC.

NG-U, A user plane interface used for NG3 reference point between new RAN and an NGC.

Non-standalone NR, A deployment configuration in which a gNB requires an LTE eNB as an anchor for a control plane connection to an EPC or requires an eLTE eNB as an anchor for a control plane connection to an NGC.

Non-standalone E-UTRA, A deployment configuration an eLTE eNB requires a gNB as an anchor for a control plane connection to an NGC.

User plane gateway, A terminal point of NG-U interface.

General System

FIG. 1 is a diagram illustrating an example of an overall structure of a new radio (NR) system to which a method proposed by the disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR(New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$ DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relationship between a UL frame and a DL frame in a wireless communication system to which a method proposed by the disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology $\mu$ slots are numbered in ascending order of $n_s^\mu \in \{0, \ldots, N_{subframe}^{slots, \mu}-1\}$ in a subframe, and in ascending order of $n_{s,f}^\mu \in \{0, \ldots, N_{frame}^{slots, \mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology $\mu$, and Table 3 shows the number of OFDM symbols per slot for an extended CP in the numerology $\mu$.

received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the disclosure may be implemented.

Referring to FIG. 3, a resource grid is composed of $N_{RB}^\mu N_{sc}^{RB}$ subcarriers in a frequency domain, each subframe composed of $14 \cdot 2\mu$ OFDM symbols, but the disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max, \mu}$. The above $N_{RB}^{max, \mu}$ indicates the maximum transmission bandwidth, and it may change not just between numerologies, but between UL and DL.

In this case, as illustrated in FIG. 4, one resource grid may be configured for the numerology $\mu$ and an antenna port p.

FIG. 4 shows examples of a resource grid for each antenna port and numerology to which a method proposed in this specification may be applied.

TABLE 2

| | | Slot configuration | | | | |
|---|---|---|---|---|---|---|
| | | 0 | | | 1 | |
| $\mu$ | $N_{symb}^\mu$ | $N_{frame}^{slots, \mu}$ | $N_{subframe}^{slots, \mu}$ | $N_{symb}^\mu$ | $N_{frame}^{slots, \mu}$ | $N_{subframe}^{slots, \mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | Slot configuration | | | | |
|---|---|---|---|---|---|---|
| | | 0 | | | 1 | |
| $\mu$ | $N_{symb}^\mu$ | $N_{frame}^{slots, \mu}$ | $N_{subframe}^{slots, \mu}$ | $N_{symb}^\mu$ | $N_{frame}^{slots, \mu}$ | $N_{subframe}^{slots, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel Each element of the resource grid for the numerology $\mu$ and the antenna port p is indicated as a resource element, and may be uniquely identified by an index pair (k,l). Herein, $k=0, \ldots, N_{RB}^\mu N_{sc}^{RB}-1$ is an index in the frequency domain, and $l=0, \ldots, 2^\mu N_{symb}^{(\mu)}-1$ indicates a location of a symbol in a subframe. To indicate a resource element in a slot, the index pair (k,l) is used. Herein, $l=0, \ldots, N_{symb}^\mu-1$.

The resource element (k,l) for the numerology $\mu$ and the antenna port p corresponds to a complex value $a_{k,l}^{(p,\mu)}$. When there is no risk of confusion or when a specific antenna port or numerology is specified, the indexes p and may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Beam Management

In the NR, beam management is defined as follows.

Beam management: a set of L1/L2 procedures for acquiring and maintaining a set of TRP(s) that may be used for DL and UL transmission and reception and/or UE beams, and includes at least the following contents:

Beam determination: an operation of selecting its own transmission/reception beam by a TRP(s) or a UE.
  Beam measurement: an operation of measuring the characteristics of a received beamforming signal by a TRP(s) or a UE.
Beam reporting: an operation of reporting information of a beamformed signal by a UE based on beam measurement.
  Beam sweeping: an operation of covering a space region using a beam transmitted and/or received during a time interval according to a predetermined method.

Furthermore, a Tx/Rx beam correspondence in a TRP and a UE is defined as follows.

A Tx/Rx beam correspondence in a TRP is maintained when at least one of the followings is satisfied.
A TRP may determine a TRP reception beam for an uplink reception based on the downlink measurement of a UE for one or more transmission beams of the TRP.
A TRP may determine a TRP Tx beam for downlink transmission based on the uplink measurement of the TRP for one or more Rx beams of the TRP.
A Tx/Rx beam correspondence in a UE is maintained when at least one of the followings is satisfied.
A UE may determine a UE Tx beam for uplink transmission based on the downlink measurement of the UE for the one or more Rx beams of the UE.
A UE may determine a UE reception beam for downlink reception on the basis of the indication of a TRP based on uplink measurement for one or more Tx beams.
The capability indication of UE beam correspondence-related information is supported for a TRP.

The following DL L1/L2 beam management procedure is supported within one or a plurality of TRPs.

P-1: this is used to make possible UE measurement for different TRP Tx beams in order to support the selection of a TRP Tx beam/UE Rx beam(s).
  In general, beamforming in a TRP includes intra/inter-TRP Tx beam sweep in different beam sets. For beamforming in a UE, in general, this includes UE Rx beam sweep from different sets of beams.
P-2: this is used so that UE measurement for different TRP Tx beams changes an inter/intra-TRP Tx beam(s).
P-3: UE measurement for the same TRP Tx beam is used to change a UE Rx beam if a UE uses beamforming.

Aperiodic reporting triggered by at least network is supported in the P-1, P-2 and P-3-related operation.

UE measurement based on an RS for beam management (at least CSI-RS) is configured with K (total number of beams) beam. A UE reports the measured results of selected N Tx beams. In this case, N is essentially not a fixed number. A procedure based on an RS for a mobility object is not excluded. Report information includes information indicating measurement quantity for an N beam(s) and N DL transmission beam if at least N<K. In particular, a UE may report a CSI-RS resource indicator (CRI) of N' with respect to K'>1 non-zero-power (NZP) CSI-RS resources.

A UE may be configured as the following higher layer parameters for beam management.

N≥1 reporting setting, M≥1 resource configuration
  Links between reporting setting and resource configurations are established in an agreed CSI measurement configuration.
  CSI-RS-based P-1 and P-2 are supported as resource and reporting setting.
  P-3 may be supported regardless of whether reporting setting is present.
Reporting setting including at least the following contents
Information indicating a selected beam
L1 measurement reporting
A time domain operation (e.g., aperiodic operation, periodic operation, semi-persistent operation)
Frequency granularity when several frequency granularities are supported
Resource setting including at least the following contents
Time domain operation (e.g., aperiodic operation, periodic operation, semi-persistent operation)
RS type: at least NZP CSI-RS
At least one CSI-RS resource set. Each CSI-RS resource set includes K≥1 CSI-RS resources (some parameters of K CSI-RS resources may be the same. For example, a port number, a time domain operation, density and a period)

Furthermore, NR supports the following beam reporting by taking into consideration L groups, that is, L>1.

Information indicating a minimum group
Measurement quantity for an N1 beam (L1 RSRP and CSI reporting support (if a CSI-RS is for CSI acquisition))
If applicable, information indicating NI DL transmission beams Group-based beam reporting, such as that described above, may be configured in a UE unit. Furthermore, the group-based beam reporting may be turned off in a UE unit (e.g., when L=1 or N1=1).

The NR supports that a UE can trigger a mechanism recovering from a beam failure.

A beam failure event occurs when quality of a beam pair link of associated control channels is sufficiently low (e.g., a comparison with a threshold, the timeout of an associated timer). The mechanism recovering from a beam failure (or blockage) is triggered when beam blockage occurs.

A network explicitly configures a UE having a resource for transmitting an UL signal for the purpose of recovery. The configuration of the resources is supported in the place where a base station listens in all or some directions (e.g., random access region).

An UL transmission/resource reporting beam blockage may be located in a PRACH (resource orthogonal to a PRACH resource) and at the same time instance or a time instance (may be configured for a UE) different from that of a PRACH. The transmission of a DL signal is supported so that a UE can monitor a beam in order to identify new potential beams.

The NR supports beam management regardless of beam-related indication. If the beam-related indication is provided, information regarding a UE-side beamforming/reception procedure used for CSI-RS-based measurement may be indicated through QCL with respect to the UE. Parameters for delay, Doppler, and an average gain used in the LTE system and a space parameter for beamforming in a receiver are expected to be added as QCL parameters to be supported in the NR. An angle of arrival-related parameter in a terminal reception beamforming viewpoint and/or angle of departure-related parameters in a base station reception beamforming viewpoint may be included. The NR supports to use the same or different beams in a control channel and corresponding data channel transmission.

For NR-PDCCH transmission supporting robustness for beam pair link blocking, a UE may be configured to monitor an NR-PDCCH on M beam pair links at the same time. In this case, M≥1 and a maximum value of M may depend on at least a UE capability.

A UE may be configured to monitor an NR-PDCCH on a different beam pair link(s) in different NR-PDCCH OFDM symbols. A parameter related to a UE Rx beam configuration for monitoring an NR-PDCCH on a plurality of beam pair links may be configured by higher layer signaling or a MAC CE and/or is taken into consideration in the discovery space design.

At least the NR supports the indication of space QCL assumption between a DL RS antenna port(s) and a DL RS antenna port(s) for the demodulation of a DL control channel. A candidate signaling method for beam indication for an NR-PDCCH (i.e., configuration method of monitoring an NR-PDCCH) is MAC CE signaling, RRC signaling, DCI signaling, a spec. transparent and/or implicit method, and a combination of these signaling methods.

For the reception of a unicast DL data channel, the NR supports the indication of space QCL assumption between a DL RS antenna port and the DMRS antenna port of a DL data channel.

Information indicating an RS antenna port is indicated through DCI (downlink permission). Furthermore, the information indicates an RS antenna port QCLed with a DMRS antenna port. A different set of DMRS antenna ports for a DL data channel may be indicated as QCL with respect to a different set of RS antenna ports.

Hereinafter, prior to describing in detail the methods proposed in the disclosure, the contents directly/indirectly related to the methods proposed in the disclosure will be briefly described.

In next-generation communication such as 5G, New RAT (NR) etc., as more communication devices require larger communication capacities, there is a need for enhanced mobile broadband communication as compared to conventional radio access technology (RAT).

In addition, massive MTC(machine type communications), which provides a variety of services anytime, anywhere by connecting multiple devices and objects, is also one of the major issues to be considered in next-generation communication.

Furthermore, the design or structure of a communication system considering a service and/or a UE sensitive to reliability and latency has been discussed.

As such, the introduction of next-generation radio access technology (RAT) considering enhanced mobile broadband (eMBB) communication, massive MTC (mMTC), URLLC (Ultra-Reliable and Low Latency Communication) and the like is currently discussed, and for convenience, the technology will be commonly referred to as 'new RAT (NR)'.

Self-Contained Slot Structure

To minimize data transmission latency in TDD systems, the fifth-generation new RAT (NR) considers a self-contained slot structure as shown in FIG. 5.

In other words, FIG. 5 is a view illustrating an example self-contained slot structure to which a method proposed in the disclosure is applicable.

In FIG. 5, the hatching area 510 indicates the downlink control area, and the solid dark area 520 indicates the uplink control area.

The uncolored area may be used for downlink data transmission or for uplink data transmission.

Such structure features that DL transmission and UL transmission are sequentially performed in one slot and, in one slot, DL data may be sent or a UL Ack/Nack may be transmitted/received as well.

Such slot may be defined as a 'self-contained slot.'

In other words, by the slot structure, the base station may reduce the time taken to retransmit data to the UE when a data transmission error occurs, thereby minimizing the latency of the final data transmission.

In the self-contained slot structure, the base station and the UE require a time gap for switching from the transmission to reception mode or from the reception to transmission mode.

To that end, in the slot structure, some OFDM symbols of the time that DL switches to UL are set as a guard period (GP).

Analog Beamforming

In a millimeter wave (mmW), multiple antenna elements may be installed in the same area because a wavelength is short.

That is, in a 30 GHz band, a wavelength is 1 cm, and a total of 64 (8×8) antenna elements may be installed in a panel of 4×4 cm at intervals of 0.5 lamda (wavelength) in a 2-dimensional array form.

Therefore, in mmW, coverage is increased or throughput is improved by raising a beamforming (BF) gain using multiple antenna elements.

In this case, if each antenna element has a transceiver unit (TXRU) so that transmission power and a phase can be adjusted, independent beamforming is possible for each frequency resource.

However, there is a problem in that effectiveness is low in terms of the price if TXRUs are installed in all of 100 antenna elements.

Therefore, a method of mapping multiple antenna elements to one TXRU and adjusting the direction of a beam using an analog phase shifter is taken into consideration.

Such an analog beamforming method has a disadvantage in that it cannot perform frequency-optional beamforming because only one beam direction can be formed in a full band.

For this reason, hybrid BF (HBF) having the number of BTXRUs smaller than Q antenna elements in the middle form of digital BF and analog BF may be taken into consideration.

HBF is different depending on a method of connecting B TXRUs and Q antenna elements, but the direction of beams that may be transmitted at the same time is limited to B or less.

FIG. 6 shows examples of a connection method of a TXRU and an antenna element.

In this case, a TXRU virtualization model shows the relation between the output signal of a TXRU and the output signals of antenna elements.

FIG. 6a shows an example of a method of connecting a TXRU to a sub-array.

Referring to FIG. 6a, an antenna element is connected to only one TXRU. Unlike FIG. 6a, FIG. 6b shows a method of connecting TXRUs to all antenna elements.

That is, in the case of FIG. 6b, the antenna elements are connected to all TXRUs.

In FIG. 6, W indicates a phase vector multiplied by an analog phase shifter.

That is, the direction of analog beamforming is determined by W. In this case, mapping between CSI-RS antenna ports and TXRUs may be 1-to-1 or 1-to-many.

CSI Feedback

In the 3GPP LTE(-A) system, it is defined that the user equipment (UE) is required to report channel state information (CSI) to the base station (BS).

Here, channel state information (CSI) collectively refers to any piece of information that may indicate the quality of a radio channel (also referred to as a 'link') formed between the UE and the antenna port.

For example, rank indicator (RI), precoding matrix indicator (PMI), or channel quality indicator (CQI) corresponds to the information.

RI indicates the rank information on the channel, meaning the number of streams that the UE receives via the same time-frequency resource. Since this value is determine dependent upon the long-term fading of channel, the RI is fed back from the UE to the BS in a typically longer period than the PMI or CQI.

The PMI is a value reflecting the channel space property. The RI indicates the precoding index favored by the UE with respect to such a metric as SINR.

The CQI is a value indicating the strength of channel. Typically, the CQI means the reception SINR obtainable when the base station (BS) uses the PMI.

In the 3GPP LTE(-A) system, the base station may set multiple CSI processes for the UE and receive a CSI report for each process.

The CSI process is constituted of the CSI-RS for specifying the quality of signal from the base station and the CSI-interference measurement (CSI-IM) resources.

RS Virtualization

In mmW, PDSCH transmission is possible in one analog beam direction at one timing by analog beamforming.

Therefore, an eNB transmits data to only some UEs in a specific direction.

Accordingly, data transmission may be performed to a plurality of UEs in several analog beam directions at the same time by differently configuring analog beam directions for each antenna port, if necessary.

FIG. 7 shows various shows examples of a service region for each TXRU.

FIG. 7 shows an example of a structure in which 256 antenna elements are equally divided into four parts to form four sub-arrays and a TXRU is connected to each sub-array.

If each sub-array is configured with a total of 64 (8×8) antenna elements in a 2-dimensional array form, a region corresponding to a horizontal angle region of 15 degrees and a vertical angle region of 15 degrees may be covered by specific analog beamforming.

That is, a region that needs to be served by an eNB is divided into multiple regions, and the regions are served one by one at once.

In the following description, it is assumed that a CSI-RS antenna port and a TXRU are 1-to-1 mapped.

Accordingly, an antenna port and a TXRU may be construed as having the same meaning.

As in FIG. 7a, if all TXRUs (antenna ports, sub-array) have the same analog beamforming direction, the throughput of a corresponding region may be increased by forming a digital beam having higher resolution.

Furthermore, the throughput of a corresponding region may be increased by increasing the rank of transmission data to the corresponding region.

Furthermore, as in FIG. 7b, if each TXRU (antenna port, sub-array) has a different analog beamforming direction, UEs distributed to a wider area can transmit data at the same time in a corresponding subframe (SF).

As shown in FIG. 7b, two of four antenna ports are used by a UE1 in a region 1 for PDSCH transmission, and the remaining two thereof is used by a UE2 in a region 2 for PDSCH transmission.

Furthermore, FIG. 7b shows an example in which a PDSCH 1 transmitted to the UE1 and a PDSCH 2 transmitted to the UE2 has been spatial-division multiplexed (SDM).

In contrast, as in FIG. 7c, the PDSCH 1 transmitted to the UE1 and the PDSCH 2 transmitted to the UE2 may be frequency-division multiplexed (FDM) and transmitted.

From among a method of providing service to one region using all antenna ports and a method of dividing antenna ports and serving several regions at the same time, a preferred method may be different depending on a rank and MCS served to a UE in order to maximize cell throughput.

Furthermore, a preferred method is different depending on the amount of data to be transmitted to each UE.

A base station calculates a cell throughput or scheduling metric which may be obtained when one region is served using all antenna ports, and calculates a cell throughput or scheduling metric which may be obtained when antenna ports are divided and two regions are served.

A base station selects the final transmission method by comparing the cell throughputs or scheduling metrics which may be obtained through the two methods.

As a result, the number of antenna ports participating in PDSCH transmission in an SF-by-SF is different.

A base station calculates the transmission MCS of a PDSCH according to the number of antenna ports, and requires suitable CSI feedback from a UE in order to incorporate the CSI feedback into a scheduling algorithm.

Channel State Information Feedback

In most cellular systems including legacy LTE systems, the UE receives a pilot signal (e.g., a reference signal (RS)) for channel estimation from the base station, computes channel state information (CSI), and reports the computed value to the base station. The base station transmits a data signal (i.e., downlink data) based on the CSI information fed back from the UE. In the case of LTE system, the CSI information fed back from the UE includes channel quality information (CQI), precoding matrix index (PMI)l and rank indicator (RI). The CQI feedback, PMI feedback, and RI feedback are described below in detail.

First, the CQI feedback is radio channel quality information that the UE provides to the base station, for the purpose of providing information about what modulation and coding scheme (MCS) to apply when the base station transmits data. Where the radio quality between the base station and the UE is high, the UE feeds back a high CQI value to the base station. Receiving the high CQI value, the base station transmits data, with a relatively high modulation order and low channel coding rate applied. In contrast, where the radio quality between the base station and the UE is low, the UE feeds back a low CQI value to the base station. Receiving the low CQI value, the base station transmits data, with a relatively low modulation order and high channel coding rate applied.

Next, the PMI feedback is preferred precoding matrix information that the UE provides to the base station, for the purpose of providing information about what multiple-input multiple-output (MIMO) precoding scheme to apply when the base station has multiple antennas. The UE estimates the downlink MIMO channel between the base station and the UE from the pilot signal and transfers, by feedback, information about what MIMO precoding is to be applied to deliver more efficiency. LTE systems consider only linear MIMO precoding that may be represented in the form of a matrix in the PMI configuration.

In this case, the base station and the UE share a codebook constituted of multiple precoding matrixes. Each MIMO precoding matrix in the codebook has a unique index. Thus, the UE minimizes its feedback information quantity by feeding back, via the PMI, the index of the most favored MIMO precoding matrix in the codebook. At this time, the PMI value need not be constituted of only one index.

As an example, where the number of transmit antennas of an LTE system is eight, such a configuration may be made that two indexes (e.g., W1 and W2) need to be combined to produce a final 8 transmit (Tx) MIMO precoding matrix. W1, which corresponds to the first PMI, is fed back in a longer period (e.g., a long term) and has a wideband property. Thus, W1 may be referred to as a wideband PMI. W2, which corresponds to the second PMI, is fed back in a shorter period (e.g., a short term) and has a subband property. Thus, W2 may be referred to as a subband PMI.

At this time, the final precoder may be constituted of the product of W1 and W2. Here, W1 may be configured to select a beam group per polarization in a cross-polarization antenna environment, and W2 may be configured for final beam selection in each polarization and co-phasing between cross-polarizations. Such an occasion may occur where the number of beams in the beam group is 1. In such a case, W2 may be configured only for co-phasing. The number of beams in the beam group and what pattern of combination of vertical beams and horizontal beams is used to select a beam group may be designated as codebook configuration parameters by the base station.

Next, the RI feedback is information about the number of preferred transmission layers that the UE provides to the base station for the purpose of providing information about transmission layers preferred by the UE when the base station and the UE have multiple antennas so that multi-layer transmission is possible via spatial multiplexing. At this time, the RI is closely related to the PMI since the base station needs to be aware what precoding should be applied to each layer depending on the number of transmission layers.

A method that may be considered in configuring PMI/RI feedback is to configure a PMI codebook based on single layer transmission and then define a PMI per layer and allow the UE to feed back. However, this method has the drawback that as the number of transmission layers increases, the quantity of PMI/RI feedback information significantly increases. Thus, in the case of LTE system, a PMI codebook is defined for each number of transmission layers. In other words, for R-layer transmission, N NtxR-size matrixes are defined in the codebook. Here, R, Nt, and N, respectively, denote the number of layers, the number of transmit antennas, and the size of codebook. Thus, in the case of LTE system, the size of PMI codebook is defined regardless of the number of transmission layers. In this case, the number R of transmission layers is identical to the rank value of the precoding matrix (NtxR matrix).

Further, a non-precoded CSI-RS-based Class A operation and a beamformed CSI-RS-based Class B are defined in the full dimension (FD)-MIMO of LTE system. Here, the most noticeable feature of Class A operation is that the PMI codebook designed for supporting horizontal beamforming has been expanded to be able to support vertical and horizontal beamforming. Unlike its legacy operation and the Class A operation, the Class B operation features that the base station applies beamforming upon CS-RS transmission (e.g., transmission in a similar manner to the DMRS).

For example, 4 port CSI-RS resource A and 4 port CSI-RS resource B may be configured to be transmitted, with beamforming applied thereto in a different direction per resource. In this case, the UE may select one with better quality of the two CSI-RS resources and then feed back channel state information (e.g., PMI, CQI, or RI) for the resource. Such index related to selection of a CSI-RS resource may be referred to as a CSI-RS resource indicator (CRI) and, as a CSI feedback parameter, the index may be fed back along with other channel state information (e.g., PMI, CQI, or RI).

In the case of Class B operation, a different type of beamforming per port in the same resource may apply. In this case, only a specific port may be selectively used with a port selection codebook, or they may be combined and used with a port combining codebook.

For enhanced FD-MIMO (eFD-MIMO), there is considered a technique denoted as a hybrid CSI operation. The concept of this technique is to expand the legacy two-step procedure, in which the base station transmits a CSI-RS and the UE computes and feeds back a CSI, to a four-step procedure: i) the base station transmits a CSI-RS; ii) the UE computes and feeds back a CSI; iii) the base station transmits a CSI-RS based on the CSI feedback; and iv) the UE computes and feeds back a CSI. At this time, the following two mechanisms may be taken into consideration.

First, considered is 'hybrid CSI mechanism 1' which is a combination of Class A and Class B operations. In this mechanism, i) the base station transmits a non-precoded CSI-RS, ii) the UE feeds back an RI and a (WB) PMI, iii) the base station transmits a beamformed CSI-RS based on the feedback information, and iv) the UE feeds back a PMI, RI, and CQI for the beamformed CSI-RS.

Considered next is 'hybrid CSI mechanism 2' which is a combination of two Class B operations. In this mechanism, i) the base station transmits multiple beamformed CSI-RS resources, ii) the UE feeds back a CRI (thus, a beam is selected), iii) the base station transmits beamformed CSI-RS ports based on the CRI, and iv) the UE feeds back a PMI, RI, and CQI for the CSI-RS.

As described herein, "PMI/RI" is not limited to the PMI/RI in the LTE system, which means the index value of the precoding matrix (NtxR matrix) and the rank value of the precoding matrix. Further, "PMI" described herein means information indicating information for a preferred MIMO precoder among MIMO precoders applicable to the transmit end. In this case, the type of precoder is not limited only to linear precoders representable as a matrix. Further, "RI" as described herein encompasses all feedback information indicating the number of preferred transmission layers and may be interpreted as broader than the RI in LTE.

The CSI information may be created in the entire or partial system frequency domain. In particular, in wideband (or broadband) systems, it may be efficient to generate and feed back CSI information for a partial frequency domain (e.g., a subband) preferred per UE.

Further, in the LTE system, feedback of CSI information is performed via an uplink channel. Typically, periodic CSI feedback is performed via the physical uplink control channel (PUCCH), and aperiodic CSI feedback is performed via the physical uplink shared channel (PUSCH).

PUCCH CSI reporting modes for periodic CSI feedback performed via the PUCCH may be defined as shown in Table 4. Here, PUCCH CSI reporting modes mean modes divided into as to what information the UE needs to feed back when the UE should perform periodic CSI feedback.

TABLE 4

| | | PMI Feedback Type | |
|---|---|---|---|
| | | No PMI (OL, single-antenna) | Single PMI (CL) |
| CQI Feedback Type | Wideband | Mode 1-0<br>RI<br>One wideband CQI(4 bit)<br>When RI > 1, CQI of first codeword | Mode 1-1<br>RI<br>Wideband CQI(4 bit)<br>Wideband spatial CQI(3 bit) for RI > 1<br>Wideband PMI(4 bit) |
| | UE selected | Mode 2-0<br>RI<br>Wideband CQI(4 bit)<br>Best-1 CQI(4 bit) in each BP<br>Best-1 indicator(L-bit label)<br>When RI > 1, CQI of first codeword | Mode 2-1<br>RI<br>Wideband CQI(4 bit)<br>Wideband spatial CQI(3 bit) for RI > 1<br>Wideband PMI(4 bit)<br>Best-1 CQI(4 bit) in each BP<br>Best-1 spatial CQI(3 bit) for RI > 1<br>Best-1 indicator(L-bit label) |

Unlike aperiodic CSI feedback, aperiodic CSI feedback is temporarily performed only when the base station sends a request for CSI feedback information. In this case, the base station triggers aperiodic CSI feedback via a downlink control channel, such as the physical determine control channel (PDCCH)/enhanced PDCCH (ePDCCH). Where aperiodic CSI feedback is triggered in an LTE system, PUSCH CSI reporting modes as to what information the UE needs to feed back may be defined as shown in Table 5. In this case, the PUSCH CSI reporting mode in which the UE is to operate may be indicated by higher layer signaling (i.e., a higher layer message).

TABLE 5

| | | PMI Feedback Type | |
|---|---|---|---|
| | | No PMI (OL, TD, single-antenna) | With PMI (CL) |
| PUSCH CQI feedback type | Wideband (Wideband CQI) | | Mode 1-2: Multiple PMI<br>RI<br>1$^{st}$ wideband CQI(4 bit)<br>2$^{nd}$ wideband CQI(4 bit) if RI > 1<br>Subband PMIs on each subband |
| | UE Selected (subband CQI) | Mode 2-0<br>RI (only for Open-loop SM)<br>Wideband CQI(4 bit) + Best-M CQI(2 bit)<br>Best-M index<br>When RI > 1, CQI of first codeword | Mode 2-2: Multiple PMI<br>RI<br>1$^{st}$ wideband CQI(4 bit) + Best-M CQI(2 bit)<br>2$^{nd}$ wideband CQI(4 bit) + Best-M CQI(2 bit) if RI > 1<br>Wideband PMI/Best-M PMI<br>Best-M index |
| | Higher layer-configured (subband CQI) | Mode 3-0<br>RI (only for Open-loop SM)<br>widebandCQI(4 bit) + subbandCQI(2 bit)<br>When RI > 1, CQI of first codeword | Mode 3-1: Single PMI<br>RI<br>1$^{st}$ wideband CQI(4 bit) + subband CQI(2 bit)<br>2$^{nd}$ wideband CQI(4 bit) + subband CQI (2 bit) if RI > 1<br>Wideband PMI |

Since the PUCCH is smaller than the PUSCH in the amount of data simultaneously transmittable (i.e., payload size), the PUCCH may have difficulty in transmitting CSI information at once. Thus, depending on each PUCCH CSI reporting mode, the time (e.g., subframe) when the CQI and PMI are transmitted may be set to differ from the time when the RI is transmitted. For example, in Mode 1-0 of Table 4, the UE may transmit only RI at a specific PUCCH transmission time and wideband CQI at a different PUCCH transmission time.

A PUCCH reporting type may be defined depending on the kind of CSI information configured at a specific PUCCH transmission time. For example, the reporting type in which RI alone is transmitted corresponds to type 3, and the reporting type in which only CQI is transmitted corresponds to type 4. A feedback period and offset for RI and a feedback period and offset for CQI/PMI may be indicated (or set) to the UE via higher layer signaling (i.e., a higher layer message).

The above-described CSI feedback information is included in the uplink control information (UCI).

Beam Reference Signal (BRS)

Beam reference signals (BRSs) are transmitted from one or more antenna ports p={0, 1, . . . , 7}.

In relation to generation of a sequence of BRSs, a reference signal sequence $r_1(m)$ is defined by Equation 2.

$$r_1(m) = \frac{1}{\sqrt{2}}(1 - 2 \cdot c(2m)) + j\frac{1}{\sqrt{2}}(1 - 2 \cdot c(2m+1)),$$ [Equation 2]

$$m = 0, 1, \ldots, 8 \cdot (N_{RB}^{max,DL} - 18) - 1$$

In Equation 2, l denotes the OFDM symbol number which is from 0 to 13. c(i) denotes the pseudo-random sequence, and the pseudo-random sequence generator may be initialized by Equation 3 at the start of each OFDM symbol.

$$C_{init} = 2^{10} \cdot (7 \cdot (n_s+1) + l'+1) \cdot (2 \cdot N_{ID}^{cell}+1) + 2 \cdot N_{ID}^{cell} + 1$$ [Equation 3]

Beam Refinement Reference Signal

Further, beam refinement reference signals are transmitted via antenna ports which are up to eight antenna ports (p=600 to 607).

In relation to generation of a beam refinement reference signal, a reference signal $r_{l,n_s}(m)$ is generated as shown in Equation 4.

$$r_{l,n_s}(m) = \frac{1}{\sqrt{2}}(1 - 2c(2m)) + j\frac{1}{\sqrt{2}}(1 - 2c(2m+1)),$$ [Equation 4]

$$m = 0, 1, \ldots, \left\lfloor \frac{3}{8} N_{RB}^{max,DL} \right\rfloor - 1$$

In Equation 4, $n_s$ denotes the slot number in the radio frame, and l denotes the OFDM symbol number in the slot. c(n) denotes the pseudo-random sequence, and the pseudo-random sequence generator is initialized by Equation 5 at the start of each OFDM symbol.

$$c_{init} = 2^{10}(7(\bar{n}_s+1)+l+1)(2N_{ID}^{BRRS}+1) + 2N_{ID}^{BRRS} + 1$$ [Equation 5]

$\bar{n}_s = n_s \bmod 20$

In Equation 5, $N_{ID}^{BRRS}$ is set for the UE via RRC signaling.

DL Phase Noise Compensation Reference Signal

The phase noise compensation reference signal associated with the xPDSCH (i.e., the PDSCH supported in the NR system) is transmitted an antenna port(s) p=60 and/or p=61 via signaling in the DCI format. Further, the phase noise compensation reference signal is present and/or valid only for xPDSCH transmission associated with the corresponding antenna port and is transmitted only in the physical resource blocks and symbols that match the corresponding xPDSCH. Further, the phase noise compensation reference signal is identical for all the symbols corresponding to xPDSCH allocation.

In relation to generation of a phase noise compensation reference signal, a reference signal sequence r(m) is defined by Equation 6.

$$r(m) = \frac{1}{\sqrt{2}}(1 - 2 \cdot c(2m)) + j\frac{1}{\sqrt{2}}(1 - 2 \cdot c(2m+1)),$$ [Equation 6]

$$m = 0, 1, \ldots, \lfloor N_{RB}^{max,DL}/4 \rfloor - 1$$

In Equation 6, c(n) denotes the pseudo-random sequence, and the pseudo-random sequence generator is initialized by Equation 7 at the start of each subframe.

$$c_{init} = (\lfloor n_s/2 \rfloor + 1) \cdot (2n_{ID}^{(nSCID)} + 1) \cdot 2^{16} + n_{SCID}$$ [Equation 7]

In Equation 7, in the case of xPDSCH transmission, $n_{SCID}$ is given by the DCI format related to xPDSCH transmission and, unless in special contexts, it is set to 0.

Further, in the case of 3-dimension multiple-input multiple-output (3D-MIMO) or full-dimension multiple-input multiple-output (FD-MIMO) technology, an active antenna system (AAS) with a 2-dimensional planar array structure may be put to use.

FIG. 8 illustrates an example MIMO system using a 2D plane array structure to which a method proposed in the disclosure is applicable.

By the 2-dimensional planar array structure, a number of antenna elements may be packed in possible base station-type elements and adaptive beamforming may be provided in the three-dimensional (3D) space.

CSI Framework in NR System

In relation to designing NR system MIMO, a CSI framework for channel state measurement and reporting between base station and UE is taken into account. The CSI framework considered for the NR system is described below in detail.

Unlike the legacy LTE system in which a CSI-related procedure is specified only in the form of a CSI process, the CSI framework may mean specifying a CSI-related procedure using CSI reporting settings, resource settings, and CSI measurement settings. Thus, in the NR system, the CSI-related procedure may be performed more flexibly fitting the channel and/or resource context.

In other words, a configuration for the CSI-related procedure in the NR system may be defined by a combination of the CSI reporting settings, resource settings, and CSI measurement settings.

For example, the UE may be configured to obtain CSI with N≥1 CSI reporting settings, M≥1 resource settings, and one CSI measurement setting. Here, the CSI measurement setting may mean setting information for the links between the N CSI reporting settings and the M resource settings. The resource settings include reference signal (RS) settings and/or interference measurement (IM) settings.

FIG. 9 illustrates an example CSI framework considered in an NR system to which a method proposed in the disclosure is applicable.

Referring to FIG. 9, a CSI framework may be configured with a reporting setting 902, a measurement setting 904, and a resource setting 906. Here, the reporting setting may mean a CSI reporting setting, the measurement setting may mean a CSI measurement setting, and the resource setting may mean a CSI-RS resource setting.

Although FIG. 9 illustrates the CSI-RS resource, embodiments of the disclosure are not limited thereto, and it may be replaced with a resource for a downlink reference signal (DL RS) available for CSI acquisition or beam management.

As shown in FIG. 9, the reporting setting 902 may consist of N (N≥1) resource settings (e.g., reporting setting n1 and reporting setting n2).

The resource setting 906 may consist of M (M≥1) resource settings (e.g., resource setting m1, resource setting m2, and resource setting m3). Here, each resource setting may include S (S≥1) resource sets, and each resource set may include K (K≥1) CSI-RS resources.

Further, the measurement setting 904 may mean setting information indicating the link between the reporting setting and the resource setting and the measurement type set for the link. In this case, each measurement setting may include L (L≥1) links. For example, the measurement setting may include setting information for the link (Link l1) between reporting setting n1 and resource setting m1 and setting information for the link (Link l2) between reporting setting n1 and resource setting m2.

At this time, Link l1 and Link l2 each may be set to any one of a link for channel measurement or a link for interference measurement. Besides, Link l1 and Link l2 may be set for rate matching or other purposes.

In this case, one or more CSI reporting settings may dynamically be selected via Layer 1 (L1) or Layer 2 (L2) signaling in one CSI measurement setting. Further, one or more CSI-RS resource sets selected from at least one resource setting and one or more CSI-RS resources selected from at least one CSI-RS resource set may also be dynamically selected via L1 or L2 signaling.

Hereinafter, the CSI reporting setting, resource setting (i.e., CSI-RS resource setting), and CSI measurement setting constituting the CSI framework considered for the NR system are described.

CSI Reporting Setting

First, CSI reporting setting may mean the type of CSI reporting that the UE is to perform on the base station and information for setting, e.g., information included in the corresponding CSI reporting.

For example, the CSI reporting setting may include, e.g., time-domain behavior type, frequency granularity, to-be-reported CSI parameters (e.g., precoding matrix indicator (PMI), rank indicator (RI), channel quality indicator (CQI)), CSI type (e.g., CSI type 1 or 2), a codebook setting including codebook subset restriction, and a measurement restriction setting.

In the disclosure, the time-domain behavior type may mean an aperiodic behavior, a periodic behavior, or a semi-persistent behavior.

At this time, the setting parameter(s) for the CSI reporting setting may be set (or indicated) by higher layer signaling (e.g., RRC signaling).

Further, as the three frequency granularities in relation to the above-described CSI reporting setting, wideband reporting, partial band reporting, and subband reporting may be supported.

Resource Setting

Next, resource setting may mean information for setting a resource to be used for CSI measurement and reporting. For example, the resource setting may include, e.g., the time-domain behavior type, RS type (e.g., non-zero power CSI-RS (NZP CSI-RS), zero power CSI-RS (ZP CSI-RS), or DMRS) and a resource set consisting of K resources.

As mentioned above, each resource setting may include one or more resource sets, and each resource set may include one or more resources (e.g., CSI-RS resources). Further, the resource setting may include settings for a signal for channel measurement and/or interference measurement.

As an example, each resource setting may include setting information for S resource sets (e.g., CSI-RS resource sets) and may also include setting information for K resources for each resource set. At this time, each resource set may correspond to a different set selected from a pool of all the CSI-RS resources set for the UE. Further, the setting information for each resource may include information regarding mapping to resource element, number of ports, and time-domain behavior type.

As another example, each resource setting may include setting information for S CSI-RS resources and/or setting information for K CSI-RS resources of the same or smaller number of ports for each CSI-RS resource.

At this time, the CSI-RS RE mapping pattern of the N-port CSI-RS resource may be constituted of one or more CSI-RS mapping patterns of the CSI-RS resources with the same or smaller number of ports (e.g., 2, 4, or 8). Here, the CSI-RS RE mapping pattern may be defined in the slot and may span over multiple configurable continuous/non-continuous OFDM symbols.

In this case, the setting parameter(s) for resource setting may be set via higher layer signaling (e.g., RRC signaling).

Further, for each semi-persistent resource setting or periodic resource setting, periodicity may be added to the setting information.

CSI Measurement Setting

Next, CSI measurement setting may mean setting information indicating what measurement the UE is to perform on a specific CSI reporting setting for CSI reporting and the specific resource setting mapped thereto. In other words, the CSI measurement setting includes information for the link between the CSI reporting setting and the resource setting and may include information indicating the measurement type for each link. Further, the measurement type may mean, e.g., channel measurement, interference measurement, or rate matching.

As an example, the CSI measurement setting may include information indicating the CSI reporting setting, information indicating the resource setting, and in the case of CQI, a setting for a reference transmission scheme. In relation thereto, the UE may support L≥1 CSI measurement settings where L may be set depending on the capability of the UE.

At this time, one CSI reporting setting may be linked to one or more resource settings, or multiple CSI reporting settings may be linked to the same resource setting.

In this case, the setting parameter(s) for CSI measurement setting may be set via higher layer signaling (e.g., RRC signaling).

Further, in the NR system, zero-power (ZP) CSI-RS-based interference measurement for CSI feedback is supported. Further, aperiodic interference measurement resource (IMR) which is based on the ZP CSI-RS for interference measurement for CSI feedback, semi-persistent IMR< and periodic IMR may be supported.

Further, in connection with the above-described CSI reporting setting, resource setting, and CSI measurement setting, the following agreements have been made depending on the time-domain behavior types.

First, in the case of periodic CSI-RS (i.e., where CSI-RS transmission is periodically performed), semi-persistent CSI reporting may be activated/deactivated by the MAC CE and/or downlink control information (DCI). In contrast, aperiodic CSI reporting may be triggered by DCI. In this case, however, additional signaling which is set by the MAC CE may be required.

Next, in the case of semi-persistent CSI-RS (i.e., where CSI-RS transmission is performed semi-persistently), periodic CSI reporting is not supported. In contrast, semi-persistent CSI reporting may be activated/deactivated by the MAC-CE and/or DCI, and semi-persistent CSI-RS may be activated/deactivated by the MAC-CE and/or DCI. Further, in this case, aperiodic CSI reporting may be triggered by the DCI, and semi-persistent CSI-RS may be activated/deactivated by the MAC-CE and/or DCI.

Lastly, in the case of aperiodic CSI-RS (i.e., where CSI-RS transmission is performed aperiodically), periodic (and semi-persistent) CSI reporting is not supported. In contrast, aperiodic CSI reporting may be triggered by the DCI, and aperiodic CSI-RS may be triggered by the DC and/or MAC-CE.

Referring to what has been described above and the agreements, the NR system may support three time-domain behavior types in relation to CSI reporting. Here, the three time-domain behavior types may mean aperiodic CSI reporting, semi-persistent CSI reporting, and periodic CSI reporting. Similarly, the NR system may support all or some of the three time-domain behavior types for (analog and/or digital) beam-related reporting.

As mentioned above, aperiodic CSI reporting may mean that the UE performs CSI reporting only when triggered. Further, semi-static CSI reporting may mean that the UE performs CSI reporting (according to a specific period) when the report is activated and stops CSI reporting when the report is deactivated. Further, periodic CSI reporting may mean that the UE performs CSI reporting according to a period and time (e.g., a slot offset) configured via, e.g., higher layer signaling (e.g., RRC signaling).

Further, upon CSI acquisition, also in the case of downlink reference signal (DL RS) for channel measurement, the above-described three time-domain behavior types (e.g., aperiodic CSI-RS, semi-persistent CSI-RS, and periodic CSI-RS) may be supported. Similarly, all or some of the above-described time-domain behavior types may be supported also for the DL RS for beam management. CSI-RS is considered as default DL RS for beam management, but other DL signals may also be available. For example, the DL RS for beam management may be, e.g., mobility RS, beam RS, synchronization signal (SS), SS block, or DL DMRS (e.g., PBCH DMRS or PDCCH DMRS).

As mentioned above, aperiodic CSI-RS may mean that the UE performs measurement on the CSI-RS only when triggered. Further, semi-static CSI-RS may mean that the UE performs measurement on the CSI-RS (according to a specific period) when the CSI-RS is activated and stops CSI-RS measurement when the CSI-RS is deactivated. Further, periodic CSI-RS may mean that the UE performs CSI-RS measurement according to a period and time (e.g., a slot offset) configured via, e.g., higher layer signaling (e.g., RRC signaling).

As mentioned above, the NR system may support ZP CSI-RS-based interference measurement schemes in relation to the interference measurement resource (IMR) that the base station designates for the UE upon CSI acquisition. Further, in connection with the interference measurement resource (IMR), at least one of non-zero-power (NZP) CSI-RS-based interference measurement scheme or DMRS-based interference measurement scheme may be supported.

In particular, unlike the LTE system (i.e., the legacy LTE system) in which the ZP CSI-RS-based IMR is set semi-statically, the NR system may support a scheme in which ZP CSI-RS-based IMR is set dynamically. For example, the ZP CSI-RS-based aperiodic IMR, semi-persistent IMR, and/or periodic IMR scheme may be used.

Thus, various combinations of the time-domain behavior types may be considered for channel estimation (or channel measurement) for CSI measurement and reporting, interference estimation (or interference measurement), and reporting. For example, aperiodic CSI reporting may be set together with aperiodic/semi-persistent/periodic NZP CSI-RS for channel measurement and aperiodic/semi-persistent/periodic ZP CSI-RS for interference measurement As another example, semi-persistent CSI reporting may be set together with semi-persistent/periodic NZP CSI-RS for channel measurement and semi-persistent/periodic ZP CSI-RS for interference measurement. As another example, periodic CSI reporting may be set together with periodic NZP CSI-RS for channel measurement and periodic ZP CSI-RS for interference measurement.

In the disclosure, 'A/B' means 'A or B,' and, for 'A/B,' various combinations in different orders may also be considered. For example, 'A/B and C/D' may mean 'A and C,' 'A and D,' 'B and C,' or 'B and D.'

In the above examples, it is assumed that aperiodic RS and/or IMR (e.g., aperiodic NZP CSI-RS and/or aperiodic ZP CSI-RS) is used only for aperiodic reporting, semi-persistent RS and/or IMR (e.g., semi-persistent NZP CSI-RS and/or semi-persistent ZP CSI-RS) is used only for aperiodic or semi-persistent reporting, and periodic RS and/or IMR (e.g., periodic NZP CSI-RS and/or periodic ZP CSI-RS) is used for all types of reporting. However, the disclosure is not limited thereto, but settings may be made with various combinations (e.g., semi-persistent reporting set together with aperiodic RS and/or IMR).

Further, the RS and IMR may be included in all the resource settings, and whether it is for the purpose of the resource (e.g., for channel estimation or for interference estimation) may be indicated via the setting on each link in the measurement setting.

Where the above-described aperiodic CSI reporting is performed on an uplink data channel (e.g., the physical uplink shared channel (PUSCH)), the following schemes may be considered.

First, the CSI report may be configured to be multiplexed with uplink data transmitted via the uplink data channel. In other words, the CSI report and uplink data may be together transmitted via the uplink data channel.

In another possible configuration, only the CSI report, without uplink data, may be transmitted via the uplink data channel.

Such schemes may be commonly applicable to uplink control channels (e.g., the physical uplink control channel (PUCCH)) as well as uplink data channels.

For the NR systems, two kinds of uplink control channels (e.g., the PUCCH) may be considered. The two kinds of uplink control channels may be individually denoted as a short PUCCH and a long PUCCH.

The short PUCCH occupies one or two OFDM symbols on the time axis and one or more physical resource blocks (PRBs) on the frequency axis. As an example, the short PUCCH may be designed for the purpose of fast ACK/NACK feedback mainly for downlink data (DL data) in the above-mentioned self-contained slot structure (e.g., FIG. 5).

In contrast, the long PUCCH occupies four to twelve OFDM symbols on the time axis and one or more PRBs on the frequency axis. As an example, the long PUCCH, similar to the legacy PUCCH (e.g., the PUCCH of the LTE system), may be designed to occupy a specific resource per UE for the purpose of ACK/NACK and/or CSI feedback.

At this time, the minimum number of long PUCCH symbols being four may be related to various slot structures being considered for the NR system. As an example, for the NR system, the number of OFDM symbols included in one slot may be set to 14 or 7.

Not only the slot structures for downlink (DL) and/or uplink (UL) purposes, but other various slot structures, such as downlink (DL) dominant or uplink (UL) dominant structures, may be considered as well. As an example, downlink dominant structure may mean a structure in which the PDCCH, PDSCH, and short PUCCH coexist in the slot, and uplink dominant structure may mean a structure in which the PDCCH and the PUSCH coexist in the slot.

Further, multiple formats may be defined for the short PUCCH and/or long PUCCH which have the same number of symbols, and the size of payload transmittable may be set to differ per format. For example, multiple short PUCCH formats and/or multiple long PUCCH formats may be defined depending on, e.g., the maximum number of UEs multiplexable or channel coding schemes.

As set forth above, the legacy LTE(-A) system supports aperiodic CSI reporting and periodic CSI reporting, and the UE is configured to perform CSI reporting via the PUSCH and PUCCH. However, the above-mentioned semi-static CSI reporting is not supported in the legacy LTE(-A) system.

In contrast, the NR system may consider aperiodic CSI reporting, periodic CSI reporting, and semi-static CSI reporting via the PUSCH and/or PUCCH. As an example, in the NR system, the UE may be configured to perform aperiodic CSI reporting via the PUSCH.

In this case, as in the legacy LTE(-A) system, the purposes (or uses) of the PUSCH in the NR system may be divided as follows.

PUSCH only for UL data transmission (hereinafter, a first PUSCH purpose)
PUSCH for UL data transmission and CSI reporting (hereinafter, a second PUSCH purpose)
PUSCH only for CSI reporting (hereinafter, a third PUSCH purpose)

As such, the purposes of PUSCH may be set depending on the type of information allocated (or transferred) to the corresponding channel (i.e., the uplink data channel). Here, types of information may be classified depending on whether the CSI report is allocated to the channel, the CSI report and UL data are allocated, or UL data is allocated to the channel. In other words, the types of information may be divided into 'CSI reporting only type,' 'CSI reporting+UL data transmission type,' and 'UL data transmission only type.'

Typically, upon PUSCH allocation, the base station may indicate, via downlink control information (DCI), which one of the three purposes the purpose of the corresponding PUSCH corresponds to.

As an example, the purpose of the PUSCH may be indicated by a combination of the UL modulation and coding scheme (UL MCS) field and the CSI request field of DCI format 0 and DCI format 4 for PUSCH allocation. Specifically, where aperiodic CSI reporting is triggered by the CSI request field, and the UL MCS field is an index corresponding to 'MCS=null value,' this may indicate the third PUSCH purpose. Further, where aperiodic CSI reporting is triggered by the CSI request field, and the UL MCS field is a value indicating a specific MCS, this may indicate the second PUSCH purpose. Further, where no aperiodic CSI reporting is triggered by the CSI request field, this may indicate the first PUSCH purpose.

The same approach may also apply to the NR system.

In the legacy LTE(-A) system, the PUSCH is allocated to a fixed timing from the time of reception of DCI. For example, where the UE receives DCI for PUSCH allocation in the nth subframe, the UE may be configured to transmit the PUSCH in the n+4th subframe.

Unlike this, in the NR system, the time of PUSCH allocation (i.e., PUSCH transmission timing) may be dynamically indicated by, e.g., DCI. Thus, more flexible PUSCH transmission may be performed in the NR system.

For example, the timing (i.e., timing offset) between UL allocation (or assignment) and the UL data transmission may be indicated by the DCI field among multiple values, and the multiple values may be configured via higher layer signaling. Of course, this way is commonly applicable to the timing between DL allocation and DL data transmission and the timing between DL data reception and transmission of an ACK/NACK for the DL data.

In connection, the NR system may consider more flexible CSI feedback timing for fast CSI acquisition.

At this time, the information transferred via CSI reporting may be configured in a diversity of manners in terms of the amount of information or computation time required. For example, the required CSI computation quantity and time may be varied depending on whether PMI is included in the CSI reporting information, the number of CSI-RS antennas when PMI is reported, and/or the codebook type.

Thus, a different CSI reporting offset value (or value range) as supported may be set per condition and, for setting a PUSCH transmission timing, such CSI reporting offset value may need to be considered. Here, CSI reporting offset may mean a time required for the UE to perform CSI reporting. As an example, the CSI reporting offset may be set on a per-slot basis (e.g., a slot offset). Or, the CSI reporting offset may be set on a per-slot basis and/or on a per-symbol basis.

In particular, in embodiments proposed herein, it is assumed to consider an aperiodic CSI reporting offset in relation to setting a PUSCH transmission timing and/or PUCCH transmission timing. Here, aperiodic CSI reporting offset may mean a time required for the UE to perform aperiodic CSI reporting.

The aperiodic CSI reporting offset may be referred to below as 'Y' for ease of description. However, the embodiments proposed herein may also be commonly applied to periodic CSI reporting and/or semi-static CSI reporting as well as aperiodic CSI reporting offset.

Further, an offset required for UL data transmission, as well as CSI reporting offset, may need to be considered to set the PUSCH transmission timing. This is why in the NR system the PUSCH may be used for the first PUSCH purpose (i.e., PUSCH only for UL data transmission) or the second PUSCH purpose (i.e., PUSCH for UL data transmission and CSI reporting).

Here, the offset required for UL data transmission may mean a time required for the UE to transmit UL data via the PUSCH and may correspond to a timing offset for transmitting the PUSCH for the first PUSCH purpose. As an example, the offset required for UL data transmission may be set on a per-slot basis (e.g., a slot offset). Or, the UL data transmission offset may be set on a per-slot basis and on a per-symbol basis.

The offset required for UL data transmission may be referred to below as 'Z' for ease of description. Hereinafter, in the embodiments proposed herein, a range of Z is set via higher layer signaling (i.e., a higher layer message), and a Z value actually applied is assumed to be indicated by DCI. In other words, in an applicable configuration, values of Z (i.e., Z value candidates) may be set via higher layer signaling, and any one of the values may be indicated by DCI.

In the disclosure, there are proposed methods for setting and/or indicating a PUSCH timing (i.e., a PUSCH transmission timing) according to the three PUSCH purposes (i.e., the first PUSCH purpose, the second PUSCH purpose, and the third PUSCH purpose), considering the aperiodic CSI reporting offset (i.e., Y) and the offset (i.e., Z) required for UL data transmission.

The disclosure also proposes a method of indicating a PUCCH-based aperiodic CSI reporting timing using downlink control information (DCI). Specifically, described in the disclosure is a method of indicating a PUCCH-based aperiodic CSI reporting timing using DCI intended for uplink resource allocation (hereinafter, UL DCI).

Although the embodiments of the disclosure are described in connection with the PUSCH for ease of description, some embodiments of the disclosure may also apply to other uplink channels (e.g., PUCCH, short PUCCH, or long PUCCH) or downlink channels (e.g., PDCCH or PDSCH).

The embodiments described below are divided merely for illustration purposes, and some configurations or features of one of the embodiments may be included in another embodiment or may be replaced with some configurations or features of the other embodiment.

First Embodiment

In a method that may be considered, the PUSCH timing values, minimum values, and/or ranges (i.e., maximum values) configurable of the first PUSCH purpose and the third PUSCH purpose may be separately configured or defined per purpose. As set forth above, PUSCH timing means a time (e.g., a time in slot units) for the UE to transmit the PUSCH and may be denoted a PUSCH timing offset.

At this time, a configuration of the PUSCH timing value, minimum value, maximum value, and/or range of the second PUSCH purpose may be set by one of four methods as follows.

Method 1: Sets it to be identical to the configuration for the PUSCH timing of the third PUSCH purpose Method 2: Sets it according to information related to the PUSCH timing of the third PUSCH purpose Method 3: Sets it separately from the configuration for the PUSCH timings of the first PUSCH purpose and the third PUSCH purpose Method 4: Sets it in a combination of the configuration for the PUSCH timing of the first PUSCH purpose and the configuration for the PUSCH timing of the third PUSCH purpose.

Where the PUSCH is used for CSI feedback purposes (i.e., the second PUSCH purpose and/or the third PUSCH purpose), the PUSCH timing value, minimum value, and/or range may be pre-specified according to a specific condition related to the configuration of CSI feedback information or the number of CSI-RS antenna ports, or may be set per CSI reporting setting (or configuration). Here, where set per CSI reporting setting, they may be limited to a value(s) meeting the minimum value requirement according to the above-described condition.

For example, where no PMI is included in the CSI feedback, the slot offset minimum value of the PUSCH timing may be set to '0.' Or Where a PMI related to the N-port CSI-RS or less is included in the CSI feedback, and no subband PMI is included, the minimum value of the PUSCH timing may be set to '1.' In contrast, where a PMI related to the N-port CSI-RS or more is included in the CSI feedback, and a subband PMI is included, the minimum value of the PUSCH timing may be set to '2.'

The configuration related to such condition may be defined over the system or may be transferred from the base station to the UE via a higher layer message. The configuration may mean a configuration for the condition itself and/or PUSCH timing value corresponding to each condition. The base station may select a specific value from among values meeting the minimum value requirement per CSI report configuration and set it for the UE.

First, where method 1 applies, the UE may receive an indication or setting of the same PUSCH timing value, minimum value, and/or range under the same condition, for the second PUSCH purpose and the third PUSCH purpose.

In contrast, where method 2 applies, the UE may receive an indication or setting of a difference in PUSCH timing value, minimum value, and/or range, for the second PUSCH purpose and the third PUSCH purpose.

For example, the information related to the PUSCH timing of the third PUSCH purpose may correspond to, e.g., information about a shift value of the minimum value and/or maximum value of configurable PUSCH timing, or information about a PUSCH timing value added/deleted. Specifically, the PUSCH timing of the second PUSCH purpose may be set to a value resultant from adding K slots or symbols (i.e., K slot or symbol delay) to the PUSCH timing of the third PUSCH purpose. Or, the PUSCH timing of the second PUSCH purpose may be set to follow the PUSCH timing of the third PUSCH purpose except for where 'timing offset=0.'

The information related to the PUSCH timing of the third PUSCH purpose may be configured commonly to the CSI reporting setting or may be configured per set of specific CSI reporting settings.

Unlike this, where method 3 applies, the UE may receive a setting (or indication) of separate PUSCH timing values, minimum values, and/or ranges depending on the three PUSCH purposes.

Further, the relevancy information in method 2 may be defined by a predetermined specific rule and/or value. For example, a range or a minimum value of the PUSCH timing value which may be allocated for the second PUSCH purpose may be defined to increase (or decrease) by a preset offset value relative to a range or a minimum value of the PUSCH timing value that may be allocated for the first PUSCH or third PUSCH purpose.

Here, the preset offset value may be, e.g., the fixed number of slots (e.g., one slot), the number of slots corresponding to a fixed absolute time (e.g., 1 msec), and a specific value (e.g., the minimum PUSCH timing for the first PUSCH purpose) determined by the PUSCH timing set for the first PUSCH purpose.

In particular, where method 4 applies, a combination of the configuration for the PUSCH timing of the first PUSCH purpose and the configuration for the PUSCH timing of the third PUSCH purpose may be defined by one of the following schemes depending on UE capability.

A scheme that may first be considered is to determine that the larger of the minimum Z value and minimum Y value settable is the minimum value of the PUSCH timing for the second PUSCH purpose. For example, where aperiodic CSI reporting and UL data transmission are transmitted together via the PUSCH, the minimum value of the transmission timing of the PUSCH may be set to the larger of the minimum value of the aperiodic CSI reporting offset and the minimum value of the offset required for UL data transmission.

Additionally, the maximum value of the PUSCH timing of the second PUSCH purpose may be determined to be the smaller of the maximum Z value and maximum Y value settable.

UE belonging to the corresponding scheme may mean a UE capable of performing in parallel encoding processing and CSI computation processing on UL data.

A scheme that may be considered next is to determine that the sum of the minimum Z value and minimum Y value settable is the minimum value of the PUSCH timing for the second PUSCH purpose. For example, where aperiodic CSI reporting and UL data transmission are transmitted together via the PUSCH, the minimum value of the transmission timing of the PUSCH may be set to the sum of the minimum value of the aperiodic CSI reporting offset and the minimum value of the offset required for UL data transmission.

Additionally, the maximum value of the PUSCH timing of the second PUSCH purpose may be determined to be the sum of the maximum Z value and maximum Y value settable.

UE belonging to the corresponding scheme may mean a UE incapable of performing in parallel (i.e., capable of performing in series) encoding processing and CSI computation processing on UL data.

In this case, the UE may need to report UE capability information, which indicates its processing capability for UL data and/or CSI computation, to the base station.

The above-described scheme considers both the timing offset required for CSI reporting and the timing offset required for UL data transmission, advantageously allowing CSI reporting and UL data transmission to be both performed without any one being dropped.

In the disclosure, the configuration (or definition) of the slot offset of PUSCH timing according to the PUSCH purpose described in connection with the embodiments may be commonly applied to the embodiments described below. In other words, in the following embodiments, such an occasion may be assumed where the slot offset of PUSCH timing is set (or defined) depending on the PUSCH purpose.

Second Embodiment

As set forth above, in the case of NR system, a timing offset (e.g., the timing offset Z for transmission of the PUSCH of the first PUSCH purpose) for UL data transmission may be dynamically indicated via DCI within a range set by higher layer signaling.

At this time, although a different mechanism (e.g., MAC-CE) may apply to the second PUSCH purpose and the third PUSCH purpose, the same signaling mechanism (i.e., a combination of higher layer signaling and DCI) as the first PUSCH purpose may be commonly used in a considerable method. This may be efficient given that the PUSCH is the same physical layer channel regardless of purposes and that the field of DCI related to the PUSCH timing (i.e., PUSCH transmission timing) may be defined.

Given this, a considerable method is to indicate the PUSCH timing via the same DCI field regardless of purposes while separately setting the PUSCH timing value indicated by each DCI code point depending on the purpose of the PUSCH. That is, despite the same DCI code point, the target (or content) indicated by the code point may be set to differ depending on the purpose of PUSCH.

Here, the DCI code point may mean a value indicated by the DCI field. As an example, where the DCI field is set to have two bits, the DCI code point may be one of '00,' '01,' '10,' and '11.'

In this case, a mapping configuration (e.g., a mapping table) between the PUSCH timing and DCI code point according to the PUSCH purpose may be pre-defined and fixed over the system, or the mapping configuration may be set and/or updated via higher layer signaling (e.g., RRC signaling or MAC-CE signaling) by the base station.

At this time, the mapping configuration for the second PUSCH purpose may follow any one of the first PUSCH purpose or the third PUSCH purpose or may be set (or indicated) separately.

Table 6 below shows an example mapping table between DCI code point and PUSCH timing depending on PUSCH purposes.

TABLE 6

| DCI code point | PUSCH timing offset (purpose 1) | PUSCH timing offset (purpose 3) |
| --- | --- | --- |
| 00 | Z1 | Y1 |
| 01 | Z2 | Y2 |
| 10 | Z3 | Y3 |
| 11 | Z4 | Y4 |

For example, where a PUSCH of the first PUSCH purpose is allocated to the UE, if the code point of the DCI field related to the PUSCH timing received by the UE is '01,' this may mean that the PUSCH timing value for the PUSCH is indicated as 'Z2.' In contrast, where a PUSCH of the third PUSCH purpose is allocated to the UE, if the code point of the DCI field related to the PUSCH timing received by the UE is '01,' this may mean that the PUSCH timing value for the PUSCH is indicated as 'Y2.'

Further, in the instant embodiment, a mapping configuration (e.g., where a mapping table is set by RRC signaling) for the second PUSCH purpose and the third PUSCH purpose or a range (e.g., where a mapping table is set by MAC-CE) of PUSCH timing indicatable via the mapping configuration may be set via higher layer signaling (e.g., RRC signaling) separately per CSI reporting setting.

For example, for the nth CSI reporting setting (CSI reporting setting #n), a range of PUSCH timing values supported for the second PUSCH purpose and a range of PUSCH timing values supported for the third PUSCH purpose each may be configured. Or, for the nth CSI reporting setting (CSI reporting setting #n), information indicating the relevancy between the PUSCH timing of the second PUSCH purpose and the PUSCH timing of the third PUSCH purpose may be configured. Here, the information indicating the relevancy may include, e.g., information about a shift value of the minimum value and/or maximum value of the PUSCH timing, or information about a PUSCH timing value added/deleted.

Further, in the instant embodiment, a mapping configuration for the second PUSCH purpose and the third PUSCH purpose or a range of PUSCH timing indicatable via the mapping configuration may be pre-defined according to a specific condition related to, e.g., the number of CSI-RS antennas, configuration of CSI feedback information.

For example, where in the PUSCH of the third PUSCH purpose, no PMI is included in the CSI feedback, three-bit DCI (or three-bit DCI field) indicating PUSCH timing may be configured to indicate PUSCH timing offsets 0 to 7. Or, where in the PUSCH of the third PUSCH purpose, a PMI related to N-port CSI-RS or less is included in the CSI feedback and no subband PMI is included, three-bit DCI (or three-bit DCI field) indicating PUSCH timing may be configured to indicate PUSCH timing offsets 1 to 8. Or, where in the PUSCH of the third PUSCH purpose, a PMI related to N-port CSI-RS or less is included in the CSI feedback and a subband PMI is included, three-bit DCI (or three-bit DCI field) indicating PUSCH timing may be configured to indicate PUSCH timing offsets 2 to 9.

As another example, where in the PUSCH of the second PUSCH purpose, no PMI is included in the CSI feedback, three-bit DCI (or three-bit DCI field) indicating PUSCH timing may be configured to indicate PUSCH timing offsets 1 to 8. Or, where in the PUSCH of the second PUSCH purpose, a PMI is included in the CSI feedback, three-bit DCI (or three-bit DCI field) indicating PUSCH timing may be configured to indicate PUSCH timing offsets 2 to 9.

As such, a mapping configuration or a range of PUSCH timing indicatable via the mapping configuration may be set or defined separately depending on the purpose of PUSCH and/or the specific condition described above.

Since the method proposed in this embodiment may indicate timings of various PUSCH purposes using a common DCI field, DCI overhead may be small and the UE's blind decoding overhead may reduce.

Further, in connection with what has been described above, the aperiodic CSI reporting offset (i.e., Y value) may be indicated by the DCI field defined to indicate the offset (i.e., Z) required for UL data transmission. Here, the offset required for UL data transmission may also be referred to as a $k_2$ value. In this case, a candidate set for the Y value may be set by high layer signaling (e.g., RRC signaling), and restricted conditions for the Y value may need to be defined depending on the configuration of CSI-related settings.

For example, given the UE implementation complexity, wideband PMI reporting and subband PMI reporting using two or four CSI-RS ports may be not allowed by the Y value which is 0 or 1. In other words, the CSI reporting timing offset which corresponds to the Y value of 0 or 1 is inapplicable to the subband PMI reporting and/or wideband PMI reporting that uses two or four CSI-RS ports.

Where the Y value is 0, use of the short PUCCH (i.e., short duration PUCCH) (if supportable) may be more appropriate than the use of PUSCH, given the slot structure of the NR system.

Further, date encoding and CSI calculation may simultaneously processed as a parallel processing implementation on the UE part so as to eliminate the need for separation of the above-described conditions for the Y values for two CSI reporting types for the PUSCH (i.e., the third PUSCH purpose (CSI only) and the second PUSCH purpose (UL data multiplexed with CSI)).

Thus, the restricted conditions for a lower Y value (e.g., 0 or 1) may be set to be commonly applied regardless of whether the CSI is multiplexed with data transmitted via PUSCH (i.e., UL data).

Further, in the NR system, a candidate set for Y values may be set for each CSI report setting, and all the setting values (e.g., all RRC setting values for the Y value) for the Y value may meet the pre-defined restricted conditions. In this case, if CSI reporting and UL data transmission are multiplexed as set forth above, a method in which the UE interprets the DCI field needs to be considered.

For example, it is assumed that for aperiodic CSI reporting offset (i.e., Y), N values ($\{y_1$ to $y_N\}$) are set and, for the offset (i.e., Z or $k_2$) required for UL data transmission, (RRC-configured) N values ($\{k_1$ to $k_N\}$) are set. In this case, when the UE receives an indication for UL data transmission along with CSI, it may be ambiguous which value it needs to follow.

A method that may be taken into consideration to address such ambiguity is to define a rule for generating a DCI table from two value sets when CSI reporting and UL data transmission are multiplexed. Another way that may be considered may be to make a setting to follow any one of the two value sets.

However, such an occasion may occur where the value indicated by the DCI belongs to neither of the two sets. As an example, the UE may interpret the DCI table from the (RRC)-configured $k_2$ values and, if the value indicated by the DCI does not belong to the set Y values, the UE may fail to secure a time sufficient to calculate the CSI.

Thus, the DCI table may be set considering all of the set Y values and the set K2 values, considering only the set Y values, or considering only the set k2 values.

Such methods may be applied to PUCCH-based aperiodic CSI reporting timing setting as well as PUSCH-based aperiodic CSI reporting timing setting.

Third Embodiment

Similar to the above-described PUSCH-based aperiodic CSI reporting timing indication, PUCCH-based aperiodic CSI reporting timing indication may also be performed via the downlink control information (DCI). In other words, the PUSCH-based aperiodic CSI reporting timing and the PUCCH-based aperiodic CSI reporting timing both may be indicated by the DCI (e.g., UL DCI).

In this case, whether it is the PUSCH-based transmission or PUCCH-based transmission may be identified explicitly by adding an indicator or implicitly using an existing field (e.g., the resource allocation field (RA field)).

For example, if reporting triggering for CSI has been performed but a specific value (e.g., a reserved value or NULL value) is indicated by the resource allocation field, this may mean PUCCH-based aperiodic CSI reporting. Or, PUSCH-based transmission and PUCCH-based transmission may be differentiated by designing different DCI formats depending on the presence or absence of the resource allocation field.

Further, the indicated PUCCH-based aperiodic CSI reporting timing may follow the predefined Y value, i.e., an allowed/disallowed condition for the predefined aperiodic CSI reporting offset. In this case, the allowed or disallowed condition may be set with respect to PUSCH-based aperiodic CSI reporting, and the PUCCH-based aperiodic CSI reporting timing may be set to follow all or some of the allowed or disallowed conditions for the PUSCH. Here, the allowed or disallowed conditions may be set depending on, e.g., the codebook type, number of CSI-RS ports, or CSI feedback content (i.e., type of CSI feedback information).

There may be no PUCCH resource available at the PUCCH-based aperiodic CSI reporting timing indicated (via DCI), or the CSI reporting timing may fail to meet the above-described allowed or disallowed conditions. In other words, although control channel-based aperiodic CSI reporting timing has been indicated via the DCI, CSI reporting via the control channel at the CSI reporting timing may be impossible indeed. Here, the available PUCCH resource may be mean a PUCCH resource allocated to the UE for PUCCH-based aperiodic CSI reporting, and this may be set via high layer signaling or physical layer signaling. As an example, the available PUCCH resource may be included and set in the above-described CSI reporting setting.

In this case, the UE may be configured to perform the indicated CSI reporting using the PUCCH resource available at the earliest timing among the subsequent PUCCH resources. In other words, if no available PUCCH resource is present or positioned at the indicated timing, the UE may perform the CSI reporting indicated by the base station using the first PUCCH resource positioned after the indicated timing among the available PUCCH resources.

Or, the UE may be configured to disregard the command or indication for the CSI reporting triggering by the base station and wait for a next indication. In other words, where no available PUCCH resource is present or positioned at the indicated timing, the UE may not perform the indicated CSI reporting but monitor the next CSI reporting indication.

Or, the UE may transmit a specific value preset (or pre-agreed) to transmit under such a context to the base station using the PUCCH resource available at the earliest timing among the subsequent PUCCH resources. In other words, if no available PUCCH resource is present or positioned at the indicated timing, the UE may transmit a preset specific value to the base station using the first PUCCH resource positioned after the indicated timing among the available PUCCH resources. For example, the UE may transmit a NULL value, prior CSI reporting value, lowest CQI value, or fault message, as the preset specific value.

The above-described three methods may apply differently depending on the earlier-mentioned allowed or disallowed conditions, PUCCH type (e.g., long PUCCH or short PUCCH), PUCCH format (e.g., PUCCH format 1 or PUCCH format 2), or PUCCH resource (e.g., PRB size).

Further, in relation to the above-described PUCCH-based aperiodic CSI reporting timing setting, the timing and/or timing range may be pre-defined depending on the PUCCH type (e.g., long PUCCH or short PUCCH), PUCCH format (e.g., PUCCH format 1 or PUCCH format 2), position in the PUCCH resource area, and/or PRB size for the PUCCH or may be set by the base station. In particular, where it is set by the base station, high layer signaling (e.g., RRC signaling or MAC layer signaling) or physical layer signaling (e.g., DCI) may be used.

Specifically, for the NR system, a short PUCCH type (i.e., short duration PUCCH type) consisting of one to two symbols and a long PUCCH type (i.e., long duration PUCCH type) consisting of four to 12 symbols are considered. Further, give this in the NR system, different configurations of reportable CSI feedback information may be defined depending on, e.g., the PUCCH type, the number of symbols allocated to PUCCH, and/or PRB size. For example, it may be configured to report only wideband CSI in the short PUCCH and to report subband CSI as well as wideband CSI in the long PUCCH.

Further, since different transmittable payload size are set depending on PUCCH formats, different CSI information configurations as supportable may be set despite the same time/frequency resource.

Further, different PUCCH symbol positions may be set in the slot and, despite the same CSI feedback information, it may be needed to set different CSI reporting timing offsets depending on the positions of PUCCH starting symbol.

Thus, different aperiodic CSI reporting timings or different aperiodic CSI reporting timing ranges may be set (or defined) considering the PUCCH type, the number of symbols allocated to PUCCH, PUCCH format, position of PUCCH in the resource area, and/or PRB size for PUCCH. Such setting may reduce signaling overhead for CSI reporting timing indication.

Where an aperiodic CSI reporting timing range is set, the base station may indicate, for the UE, a specific value in the range via high layer signaling (e.g., RRC signaling, MAC layer signaling (i.e., MAC-CE)) and/or physical layer signaling (e.g., DCI). Or, where an aperiodic CSI reporting timing range is set for the UE, the UE may be configured to perform CSI reporting via a specific resource (e.g., the first resource, or a resource arbitrarily selected by the UE) among the PUCCH resources available in the range.

Further, where PUCCH-based aperiodic CSI reporting triggering is indicated by DCI (in particular, UL DCI) as described above, a method for indicating and/or setting an offset value (or offset information) between PUSCH-based CSI reporting timing and PUCCH-based CSI reporting timing may be additionally considered. Here, PUSCH-based CSI reporting timing and/or PUCCH-based CSI reporting timing each may be represented as offset information with respect to a specific timing.

Specifically, where the DCI field indicating the PUSCH-based CSI reporting timing included in the UL DCI also indicates the PUCCH-based CSI reporting timing, information for the difference value between the PUSCH-based CSI reporting timing (i.e., PUSCH timing offset) and the PUCCH-based CSI reporting timing may further be required.

At this time, the difference value may be predefined as a specific value (e.g., +1 slot or −1 slot) or may be set by high layer signaling (e.g., RRC signaling or MAC layer signaling (MAC-CE)) by the base station. Or, where a set (or candidates) for the difference value is set by high layer signaling, a specific value among them may be indicated by a separate DCI field (e.g., 1 or 2 bits).

For example, where PUSCH transmission timing (or PUSCH timing offset) of UL data transmission-purpose (i.e., the first PUSCH purpose) is set as {0, 1, 2, 3} by high layer signaling, one among them may be indicated by two-bit DCI. At this time, where the defined or set slot timing offset value, i.e., the difference value between the PUSCH-based CSI reporting timing and the PUCCH-based CSI reporting timing is set or indicated as one slot, the UE may interpret that the slot offset value to be used for PUCCH-based CSI reporting is {1, 2, 3, 4}. At this time, where the indicator for (PUCCH-based) aperiodic CSI reporting triggering is turned on in the UL DCI and one slot is set as the PUSCH transmission timing (i.e., the slot offset for PUSCH transmission), the UE may perform UL data transmission and/or CSI reporting via PUSCH one slot after the slot where the DCI has been received and perform CSI reporting via PUCCH after two slots. Here, the frequency resource used for the PUSCH and PUCCH may be indicated by the resource allocation (RA) field included in the UL DCI.

In connection thereto, the resource allocation field (e.g., PUSCH time resource allocation field) for the PUSCH present in the UL DCI may be reused for resource allocation (e.g., PUCCH time resource allocation) for PUCCH. In this case, the UE may be configured to use a predefined rule or equation for resource allocation for PUCCH or to use a table separately configured from that for PUSCH so as to interpret the field value as one for the purpose of PUCCH resource allocation.

Where the time-domain resource of PUCCH is allocated by the field (i.e., the field for PUSCH resource allocation), only slot-unit timing for PUCCH may be indicated or set. In this case, the specific PUCCH symbol location and/or duration in the slot may be set or indicated by separate signaling, such as high layer signaling.

However, if simultaneous triggering of PUSCH-based aperiodic CSI reporting and PUCCH-based aperiodic CSI reporting via UL DCI is allowed as in the above-described method, the method of implicitly differentiating between PUSCH-based transmission and PUCCH-based transmission via a specific value (e.g., reserved value or NULL) of the resource allocation field may be invalid.

In this case, where the resource allocation field is configured, with an indicator for differentiating between PUSCH-based transmission and PUCCH-based transmission included in the aperiodic CSI reporting triggering field, it may be differentiated whether CSI reporting is performed with it piggybacked (or multiplexed) with the PUSCH or UL data is transmitted in the PUSCH designated in the resource allocation field and CSI reporting is performed via PUCCH.

At this time, the indicator may be implicitly differentiated by the reporting setting indicator (or reporting setting type indicator). For example, where multiple reporting settings are set via, e.g., RRC signaling, to perform aperiodic CSI reporting, whether it is PUSCH-based transmission or PUCCH-based transmission may be differentiated for each reporting setting (via a specific type of indicator). In this case, if the base station dynamically indicates the reporting setting ID (or reporting setting type identifier) via DCI and/or MAC-CE, the UE may interpret the DCI field for aperiodic CSI reporting triggering distinctly between the PUSCH-based case or the PUCCH-based case.

Where PUCCH-based aperiodic (or semi-persistent) CSI reporting is indicated, UL resource allocation field is not necessary. Thus, it is indicated via DL DCI and, only when PUSCH-based aperiodic (or semi-persistent) CSI reporting is indicated, it may be indicated via UL DCI.

Further, a DCI field for indicating aperiodic CSI reporting triggering may be specified in the DL DCI as well as the UL DCI. Where CSI reporting triggering is indicated via DL DCI, the PUCCH resource may dynamically be allocated via the resource allocation field or a separate field. For example, where the DL DCI indicates that aperiodic CSI reporting triggering is on, the UE may interpret the resource allocation field as information for selecting a specific resource among the PUCCH resources (e.g., PUCCH resources preset by RRC signaling and/or MAC layer signaling). In contrast, where the DL DCI indicates that aperiodic CSI reporting triggering is off, the UE may interpret the resource allocation field as setting information for the resource position of PDSCH for DL resource reception.

The above-described methods for differentiating between PUSCH-based aperiodic CSI reporting and PUCCH-based aperiodic CSI reporting are applicable to methods for differentiating between PUSCH-based semi-persistent CSI reporting and PUCCH-based semi-persistent CSI reporting. At this time, the above-described ON/OFF information for aperiodic CSI reporting triggering may be changed to ON/OFF information for activation of semi-persistent CSI reporting and/or ON/OFF information for deactivation or release of semi-persistent CSI reporting.

FIG. 10 is a flowchart illustrating operations of a UE performing channel state information (CSI) reporting in a wireless communication system to which a method proposed in the disclosure is applicable. FIG. 10 is intended merely for illustration purposes but not for limiting the scope of the disclosure.

Referring to FIG. 10, it is assumed that the UE is implemented to perform control channel (e.g., PUCCH)-based CSI reporting and/or data channel (e.g., PUSCH)-based CSI reporting as described above.

The UE may receive setting information for control channel-based CSI reporting from the base station (S1005). As an example, the control channel-based CSI reporting may be aperiodic CSI reporting that is performed after receiving a triggering indication from the base station.

At this time, the setting information may include information indicating that one or more control channel resources (e.g., the above-described available PUCCH resource(s)) allocated for control channel-based CSI reporting. The setting information may be a CSI reporting setting or a CSI reporting setting subset and may be transferred via high layer signaling.

The UE may receive downlink control information including information indicating the CSI reporting time (i.e., the above-described CSI reporting timing) when control channel-based CSI reporting is to be performed from the base station (S1010). At this time, as described above, the downlink control information received by the UE may be downlink control information (i.e., UL DCI) including the uplink resource allocation information (e.g., uplink time/frequency resource allocation information) for uplink transmission.

Thereafter, the UE may report the CSI measured by the CSI-RS received from the base station via the control channel at the indicated CSI reporting time (S1015).

At this time, as described above, the downlink control information may further include an indicator as to which one of control channel-based transmission or data channel-based transmission the CSI reporting time has been set for.

Further, where none of the one or more control channel resources are positioned at the indicated CSI reporting time, the UE may perform CSI reporting via the first control channel resource positioned after the indicated CSI reporting time among the one or more control channel resources. Or, where none of the one or more control channel resources are positioned at the indicated CSI reporting time, the UE may transmit a preset specific value (e.g., NULL) to the base station via the first control channel resource positioned after the indicated CSI reporting time among the one or more control channel resources.

Further, as described above, the setting information may further include information indicating a range of the CSI reporting time for control channel-based CSI reporting. At this time, the range of the CSI reporting time may be set according to at least one of control channel type, control channel format, the number of symbols comprising the control channel, or physical resource block size of control channel.

Further, the downlink control information may further include information indicating the CSI reporting timing offset between control channel-based CSI reporting and data channel-based CSI reporting. Here, the CSI reporting timing offset between control channel-based CSI reporting and data channel-based CSI reporting may mean an offset between control channel-based CSI reporting timing and data channel-based CSI reporting timing. At this time, the setting information may further include candidates of CSI reporting timing offset among which one may be indicated via downlink control information. In this case, the candidates may be set in slot units in the time domain.

General Apparatus to which the Disclosure May be Applied

FIG. 11 illustrates a block diagram of a wireless communication device according to an embodiment of the disclosure.

Referring to FIG. 11, a wireless communication system includes an eNB (or network) 1110 and a UE 1120.

The eNB 1110 includes a processor 1111, a memory 1112, and a communication module 1113.

The processor 1111 implements the functions, processes and/or methods proposed in FIGS. 1 to 10. The layers of a wired/wireless interface protocol may be implemented by the processor 1111. The memory 1112 is connected to the processor 1111 and stores various types of information for driving the processor 1111. The communication module 1113 is connected to the processor 1111 and transmits and/or receives wired/wireless signals.

The communication module 1113 may include a radio frequency (RF) unit for transmitting/receiving a radio signal.

The UE 1120 includes a processor 1121, a memory 1122, and a communication module (or the RF unit) 1123. The processor 1121 implements the functions, processes and/or methods proposed in FIGS. 1 to 10. The layers of a radio interface protocol may be implemented by the processor 1121. The memory 1122 is connected to the processor 1121 and stores various types of information for driving the processor 1121. The communication module 1123 is connected to the processor 1121 and transmits and/or receives a radio signal.

The memory 1112, 1122 may be positioned inside or outside the processor 1111, 1121 and may be connected to the processor 1111, 1121 by various well-known means.

Furthermore, the eNB 1110 and/or the UE 1120 may have a single antenna or multiple antennas.

FIG. 12 illustrates a block diagram of a communication device according to an embodiment of the disclosure.

Particularly, FIG. 12 is a diagram illustrating the UE of FIG. 11 more specifically.

Referring to FIG. 12, the UE may include a processor (or digital signal processor (DSP)) 1210, an RF module (or RF unit) 1235, a power management module 1205, an antenna 1240, a battery 1255, a display 1215, a keypad 1220, a memory 1230, a subscriber identification module (SIM) card 1225 (this element is optional), a speaker 1245, and a microphone 1250. The UE may further include a single antenna or multiple antennas.

The processor 1210 implements the function, process and/or method proposed in FIGS. 1 to 10. The layers of a radio interface protocol may be implemented by the processor 1210.

The memory 1230 is connected to the processor 1210, and stores information related to the operation of the processor 1210. The memory 1230 may be positioned inside or outside the processor 1210 and may be connected to the processor 1210 by various well-known means.

A user inputs command information, such as a telephone number, by pressing (or touching) a button of the keypad 1220 or through voice activation using the microphone 1250, for example. The processor 1210 receives such command information and performs processing so that a proper function, such as making a phone call to the telephone number, is performed. Operational data may be extracted from the SIM card 1225 or the memory 1230. Furthermore, the processor 1210 may recognize and display command information or driving information on the display 1215, for convenience sake.

The RF module 1235 is connected to the processor 1210 and transmits and/or receives RF signals. The processor 1410 delivers command information to the RF module 1235 so that the RF module 1235 transmits a radio signal that forms voice communication data, for example, in order to initiate communication. The RF module 1235 includes a receiver and a transmitter in order to receive and transmit radio signals. The antenna 1240 functions to transmit and receive radio signals. When a radio signal is received, the RF module 1235 delivers the radio signal so that it is processed by the processor 1210, and may convert the signal into a baseband. The processed signal may be converted into audible or readable information output through the speaker 1245.

The aforementioned embodiments have been achieved by combining the elements and characteristics of the disclosure in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. Order of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

Although the methods of reporting channel state information in a wireless communication system have been described in connection with examples in which they apply to 3GPP LTE/LTE-A systems, and 5G systems, the methods are also applicable to other various wireless communication systems.

The invention claimed is:

1. A method of reporting channel state information (CSI) by a user equipment (UE) in a wireless communication system, the method comprising:
   receiving, from a base station, setting information for aperiodic CSI reporting;
   receiving, from the base station, downlink control information (DCI) including (i) first information indicating a CSI reporting timing for the aperiodic CSI reporting and (ii) second information indicating whether the aperiodic CSI reporting is a control channel-based CSI reporting or a data channel-based CSI reporting; and
   reporting, to the base station, an aperiodic CSI measured by a channel state information reference signal (CSI-RS) received from the base station,
   wherein based on the second information indicating that the aperiodic CSI reporting is the control channel-based CSI reporting, the aperiodic CSI is transmitted via a control channel at the CSI reporting timing, and
   wherein the setting information includes information indicating one or more control channel resources allocated for the control channel-based CSI reporting.

2. The method of claim 1, wherein the DCI includes uplink resource allocation information for uplink transmission.

3. The method of claim 1, wherein the second information also indicates whether the CSI reporting timing is set for the control channel-based CSI reporting or the data channel-based CSI reporting.

4. The method of claim 1, wherein based on none of the one or more control channel resources being positioned at the CSI reporting timing, the aperiodic CSI is transmitted via a first control channel resource positioned after the CSI reporting timing among the one or more control channel resources.

5. The method of claim 1, further comprising:
   based on none of the one or more control channel resources being positioned at the CSI reporting timing, transmitting a preset specific value to the base station via a first control channel resource positioned after the CSI reporting timing among the one or more control channel resources.

6. The method of claim 1,
   wherein the setting information further includes information indicating a range of the CSI reporting timing for the control channel-based CSI reporting, and
   wherein the range of the CSI reporting timing is set according to at least one of a type of the control channel, a format of the control channel, the number of symbols comprising the control channel, or a physical resource block size of the control channel.

7. The method of claim 1, wherein the DCI further includes information indicating a CSI reporting timing offset between the control channel-based CSI reporting and the data channel-based CSI reporting.

8. The method of claim 7,
   wherein the setting information further includes candidate values for the CSI reporting timing offset, and
   wherein the CSI reporting timing offset indicated via the DCI is one of the candidate values.

9. The method of claim 8, wherein the candidate values are set in slot units in a time domain.

10. A user equipment (UE) reporting channel state information (CSI) in a wireless communication system, the UE comprising:
    a transceiver; and
    a processor functionally connected with the transceiver, wherein
    the processor performs control to:
    receive, from a base station, setting information for an aperiodic CSI reporting,
    receive, from the base station, downlink control information (DCI) including (i) first information indicating a CSI reporting timing for the aperiodic CSI reporting and (ii) second information indicating whether the aperiodic CSI reporting is a control channel-based CSI reporting or a data channel-based CSI reporting, and
    report, to the base station, an aperiodic CSI measured by a channel state information reference signal (CSI-RS) received from the base station,
    wherein based on the second information indicating that the aperiodic CSI reporting is the control channel-based CSI reporting, the aperiodic CSI is transmitted via a control channel at the CSI reporting timing, and
    wherein
    the setting information includes information indicating one or more control channel resources allocated for the control channel-based CSI reporting.

11. The UE of claim 10, wherein the DCI includes uplink resource allocation information for uplink transmission.

12. The UE of claim 10, wherein the second information also indicates whether the CSI reporting time is set for the control channel-based CSI reporting or the data channel-based CSI reporting.

13. The UE of claim 10,
    wherein the setting information further includes information indicating a range of CSI reporting timing for the control channel-based CSI reporting, and
    wherein the range of the CSI reporting timing is set according to at least one of a type of the control channel, a format of the control channel, the number of symbols comprising the control channel, or a physical resource block size of the control channel.

* * * * *